United States Patent
Landis et al.

(10) Patent No.: US 11,792,719 B2
(45) Date of Patent: *Oct. 17, 2023

(54) UE REPORT OF TIME DELAYS AND PHASES FROM MULTIPLE TRANSMISSION-RECEPTION POINTS FOR PRE-EQUALIZATION

(71) Applicant: QUALCOMM Incorporated, San Diego, CA (US)

(72) Inventors: Shay Landis, Hod Hasharon (IL); Assaf Touboul, Netanya (IL); Yehonatan Dallal, Kfar Saba (IL); Idan Michael Horn, Hod Hasharon (IL); Michael Levitsky, Rehovot (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,627

(22) Filed: Aug. 26, 2022

(65) Prior Publication Data

US 2023/0058702 A1 Feb. 23, 2023

Related U.S. Application Data

(63) Continuation of application No. 17/033,137, filed on Sep. 25, 2020, now Pat. No. 11,432,230.

(51) Int. Cl.
*H04W 4/00* (2018.01)
*H04W 48/14* (2009.01)
(Continued)

(52) U.S. Cl.
CPC ........... *H04W 48/14* (2013.01); *H04W 24/10* (2013.01); *H04W 48/16* (2013.01); *H04W 72/542* (2023.01)

(58) Field of Classification Search
CPC ... H04W 48/14; H04W 48/16; H04W 72/542; H04W 24/10
(Continued)

(56) References Cited

U.S. PATENT DOCUMENTS

| 11,432,230 B2 | 8/2022 | Landis |
| 2013/0022090 A1 | 1/2013 | Weng et al. |

(Continued)

FOREIGN PATENT DOCUMENTS

| CN | 102624667 B | 9/2014 |
| WO | 2008057014 A1 | 5/2008 |

OTHER PUBLICATIONS

Du Q., et al., "ICI Mitigation by Doppler Frequency Shift Estimation and Pre-Compensation in LTE-R Systems", 2012 1st IEEE International Conference on Communications in China (ICCC), IEEE, Aug. 15, 2012 (Aug. 15, 2012), pp. 469-474, XP032268050, DOI: 10.1109/ICCCHINA.2012.6356928, ISBN: 978-1-4673-2814-2, paragraph [0028]-paragraph [0037].

(Continued)

*Primary Examiner* — Temica M Beamer
(74) *Attorney, Agent, or Firm* — Loza & Loza LLP / QUALCOMM Incorporated

(57) ABSTRACT

Aspects of disclosure relate to a UE reporting to a gNB time delays and phases of pilot signals received via multiple transmission paths in order for the gNB to pre-equalize a future transmission to the UE. The UE determines a first time delay for receiving a first pilot signal from a gNB via a first path, determines a second time delay for receiving a second pilot signal from the gNB via a second path, and generates a report based on the first time delay and the second time delay. The UE then sends the report to the gNB and receives a multi-TRP signal from the gNB via the first path and the second path, wherein the multi-TRP signal is (Continued)

pre-equalized for transmission based on the report to at least have a same time delay as a shorter one of the first time delay or the second time delay.

36 Claims, 13 Drawing Sheets

(51) Int. Cl.
 *H04W 24/10* (2009.01)
 *H04W 48/16* (2009.01)
 *H04W 72/542* (2023.01)

(58) Field of Classification Search
 USPC .......................................................... 370/329
 See application file for complete search history.

(56) References Cited

U.S. PATENT DOCUMENTS

2013/0250876 A1  9/2013  Hugl et al.
2016/0112179 A1  4/2016  Cai et al.

OTHER PUBLICATIONS

International Search Report and Written Opinion—PCT/US2021/047558—ISA/EPO—dated Dec. 21, 2021.

UE REPORT OF TIME DELAYS AND PHASES FROM MULTIPLE TRANSMISSION-RECEPTION POINTS FOR PRE-EQUALIZATION

CROSS-REFERENCE TO RELATED APPLICATIONS

This application is a continuation of U.S. Non-Provisional application Ser. No. 17/033,137 entitled "UE REPORT OF TIME DELAYS AND PHASES FROM MULTIPLE TRANSMISSION-RECEPTION POINTS FOR PRE-EQUALIZATION" filed on Sep. 25, 2020, the entire content of which is incorporated herein as if frilly set forth below in its entirety and for all applicable purposes.

INTRODUCTION

The present disclosure relates generally to communication systems, and more particularly, to wireless communication via multiple transmission-reception points (TRPs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-TDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G-NR technology. These improvements may also be applicable to other multi-access technologies and the telecommunication standards that employ these technologies.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects as a prelude to the more detailed description that is presented later.

Aspects of disclosure relate to a user equipment (UE) reporting to a gNB time delays and phases of signals received via multiple transmission-reception points (TRPS) in order for the gNB to pre-equalize a future transmission to the UE. The UE determines a first time delay for receiving a first pilot signal from a gNB via a first transmission-reception point (TRP), determines a second time delay for receiving a second pilot signal from the gNB via the second TRP, and generates a message based on the first time delay and the second time delay. The UE then sends the message to the gNB and receives a multi-TRP signal from the gNB via the first TRP and the second TRP, wherein the multi-TRP signal is pre-equalized for transmission via the first TRP and the second TRP based on the message to at least have a same time delay as a shorter one of the first time delay corresponding to the first TRP or the second time delay corresponding to the second TRP.

In an aspect of the disclosure, a method, an apparatus, and a computer-readable medium are provided. In one example, a method of wireless communication at a user equipment (UE) is disclosed. The method includes determining a first time delay for receiving a first pilot signal from a base station via a first transmission path, determining a second time delay for receiving a second pilot signal from the base station via a second transmission path, generating a message based on the first time delay and the second time delay, sending the message to the base station, and receiving a multi-transmission-reception point (TRP) signal from the base station via the first transmission path and the second transmission path, wherein the multi-TRP signal is pre-equalized for transmission via the first transmission path and the second transmission path based on the message to at least have a same time delay as a shorter one of the first time delay corresponding to the first transmission path or the second time delay corresponding to the second transmission path.

In another example, a user equipment (UE) is disclosed. The UE includes at least one processor and a memory coupled to the at least one processor. The at least one processor and the memory are configured to determine a first time delay for receiving a first pilot signal from a base station via a first transmission path, determine a second time delay for receiving a second pilot signal from the base station via a second transmission path, generate a message based on the first time delay and the second time delay, send the message to the base station, and receive a multi-transmission-reception point (TRP) signal from the base station via the first transmission path and the second transmission path, wherein the multi-TRP signal is pre-equalized for transmission via the first transmission path and the second transmission path based on the message to at least have a same time delay as a shorter one of the first time delay corresponding to the first transmission path or the second time delay corresponding to the second transmission path.

In a further example, a user equipment (UE) is disclosed. The UE includes means for determining a first time delay for receiving a first pilot signal from a base station via a first transmission path, means for determining a second time delay for receiving a second pilot signal from the base station via a second transmission path, means for generating a message based on the first time delay and the second time delay, means for sending the message to the base station, and means for receiving a multi-transmission-reception point (TRP) signal from the base station via the first transmission path and the second transmission path, wherein the multi-TRP signal is pre-equalized for transmission via the first transmission path and the second transmission path based on the message to at least have a same time delay as a shorter one of the first time delay corresponding to the first transmission path or the second time delay corresponding to the second transmission path.

In yet another example, a non-transitory computer-readable medium storing code at a user equipment (UE) is disclosed. The code includes instructions executable by a processor to determine a first time delay for receiving a first pilot signal from a base station via a first transmission path, determine a second time delay for receiving a second pilot signal from the base station via a second transmission path, generate a message based on the first tune delay and the second time delay, send the message to the base station, and receive a multi-transmission-reception point (TRP) signal from the base station via the first transmission path and the second transmission path, wherein the multi-TRP signal is pre-equalized for transmission via the first transmission path and the second transmission path based on the message to at least have a same time delay as a shorter one of the first time delay corresponding to the first transmission path or the second time delay corresponding to the second transmission path.

In one example, a method of wireless communication performed at a user equipment (UE) is disclosed. The method includes determining a first phase of a first pilot signal received from a base station via a first transmission path, determining a second phase of a second pilot signal received from the base station via a second transmission path, generating a message based on the first phase and the second phase, sending the message to the base station, and receiving a multi-transmission-reception point (TRP) signal from the base station via the first transmission path and the second transmission path, wherein the multi-TRP signal is pre-equalized for transmission via the first transmission path and the second transmission path based on the message to at least have a same phase as one of the first phase or the second phase.

In another example, a user equipment (UE) is disclosed. The UE includes at least one processor and a memory coupled to the at least one processor. The at least one processor and the memory are configured to determine a first phase of a first pilot signal received from a base station via a first transmission path, determine a second phase of a second pilot signal received from the base station via a second transmission path, generate a message based on the first phase and the second phase, send the message to the base station, and receive a multi-transmission-reception point (TRP) signal from the base station via the first transmission path and the second transmission path, wherein the multi-TRP signal is pre-equalized for transmission via the first transmission path and the second transmission path based on the message to at least have a same phase as one of the first phase or the second phase.

In a further example, a user equipment (UE) is disclosed. The UE includes means for determining a first phase of a first pilot signal received from a base station via a first transmission path, means for determining a second phase of a second pilot signal received from the base station via a second transmission path, means for generating a message based on the first phase and the second phase, means for sending the message to the base station, and means for receiving a multi-transmission-reception point (TRP) signal from the base station via the first transmission path and the second transmission path, wherein the multi-TRP signal is pre-equalized for transmission via the first transmission path and the second transmission path based on the message to at least have a same phase as one of the first phase or the second phase.

In yet another example, a non-transitory computer-readable medium storing code at a user equipment (UE) is disclosed. The code includes instructions executable by a processor to determine a first phase of a first pilot signal received from a base station via a first transmission path, determine a second phase of a second pilot signal received from the base station via a second transmission path, generate a message based on the first phase and the second phase, send the message to the base station, and receive a multi-transmission-reception point (TRP) signal from the base station via the first transmission path and the second transmission path, wherein the multi-TRP signal is pre-equalized for transmission via the first transmission path and the second transmission path based on the message to at least have a same phase as one of the first phase or the second phase.

In one example, a method of wireless communication performed at a base station is disclosed. The method includes transmitting a first pilot signal to a user equipment (UE) via a first transmission path, transmitting a second pilot signal to the UE via a second transmission path receiving a message from the UE based on a first time delay at which the UE receives the first pilot signal and a second time delay at which the UE receives the second pilot signal, pre-equalizing a multi-transmission-reception point (TRP) signal for transmission via the first transmission path and the second transmission path based on the message to at least have a same time delay as a shorter one of the first time delay corresponding to the first transmission path or the second time delay corresponding to the second transmission path, and transmitting the multi-TRP signal to the UE via the first transmission path and the second transmission path.

In another example, a base station is disclosed. The base station includes at least one processor and a memory coupled to the at least one processor. The at least one processor and the memory are configured to transmit a first pilot signal to a user equipment (UE) via a first transmission path, transmit a second pilot signal to the UE via a second transmission path, receive a message from the UE based on a first time delay at which the UE receives the first pilot signal and a second time delay at which the UE receives the second pilot signal, pre-equalize a multi-transmission-reception point (TRP) signal for transmission via the first transmission path and the second transmission path based on the message to at least have a same time delay as a shorter one of the first time delay corresponding to the first transmission path or the second time delay corresponding to the second transmission path, and transmit the multi-TRP signal to the UE via the first transmission path and the second transmission path.

In a further example, a base station is disclosed. The base station includes means for transmitting a first pilot signal to a user equipment (UE) via a first transmission path, means for transmitting a second pilot signal to the UE via a second transmission path, means for receiving a message from the UE based on a first time delay at which the UE receives the first pilot signal and a second time delay at which the UE receives the second pilot signal, means for pre-equalizing a multi-transmission-reception point (TRP) signal for transmission via the first transmission path and the second transmission path based on the message to at least have a same time delay as a shorter one of the first time delay corresponding to the first transmission path or the second time delay corresponding to the second transmission path, and means for transmitting the multi-TRP signal to the UE via the first transmission path and the second transmission path.

In yet another example, a non-transitory computer-readable medium storing code at a base station is disclosed. The code includes instructions executable by a processor to transmit a first pilot signal to a user equipment (UE) via a first transmission path, transmit a second pilot signal to the UE via a second transmission path, receive a message from the UE based on a first time delay at which the UE receives the first pilot signal and a second time delay at which the UE receives the second pilot signal, pre-equalize a multi-transmission-reception point (TRP) signal for transmission via the first transmission path and the second transmission path based on the message to at least have a same time delay as a shorter one of the first time delay corresponding to the first transmission path or the second time delay corresponding to the second transmission path, and transmit the multi-TRP signal to the UE via the first transmission path and the second transmission path.

In one example, a method of wireless communication performed at a base station is disclosed. The method includes transmitting a first pilot signal to a user equipment (UE) via a first transmission path, transmitting a second pilot signal to the UE via a second transmission path, receiving a message from the UE based on a first phase at which the UE receives the first pilot signal and a second phase at which the UE receives the second pilot signal, pre-equalizing a multi-transmission-reception point (TRP) signal for transmission via the first transmission path and the second transmission path based on the message to at least have a same phase as one of the first phase or the second phase, and transmitting the multi-TRP signal to the UE via the first transmission path and the second transmission path.

In another example, a base station is disclosed. The base station includes at least one processor and a memory coupled to the at least one processor. The at least one processor and the memory are configured to transmit a first pilot signal to a user equipment (UE) via a first transmission path, transmit a second pilot signal to the UE via a second transmission path, receive a message from the UE based on a first phase at which the UE receives the first pilot signal and a second phase at which the UE receives the second pilot signal, pre-equalize a multi-transmission-reception point (TRP) signal for transmission via the first transmission path and the second transmission path based on the message to at least have a same phase as one of the first phase or the second phase, and transmit the multi-TRP signal to the UE via the first transmission path and the second transmission path.

In a further example, a base station is disclosed. The base station includes means for transmitting a first pilot signal to a user equipment (UE) via a first transmission path, means for transmitting a second pilot signal to the UE via a second transmission path, means for receiving a message from the UE based on a first phase at which the UE receives the first pilot signal and a second phase at which the UE receives the second pilot signal, means for pre-equalizing a multi-transmission-reception point (TRP) signal for transmission via the first transmission path and the second transmission path based on the message to at least have a same phase as one of the first phase or the second phase, and means for transmitting the multi-TRP signal to the UE via the first transmission path and the second transmission path.

In yet another example, a non-transitory computer-readable medium storing code at a base station is disclosed. The code includes instructions executable by a processor to transmit a first pilot signal to a user equipment (UE) via a first transmission path, transmit a second pilot signal to the UE via a second transmission path, receive a message from the UE based on a first phase at which the UE receives the first pilot signal and a second phase at which the UE receives the second pilot signal, pre-equalize a multi-transmission-reception point (TRP) signal for transmission via the first transmission path and the second transmission path based on the message to at least have a same phase as one of the first phase or the second phase, and transmit the multi-TRP signal to the UE via the first transmission path and the second transmission path.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
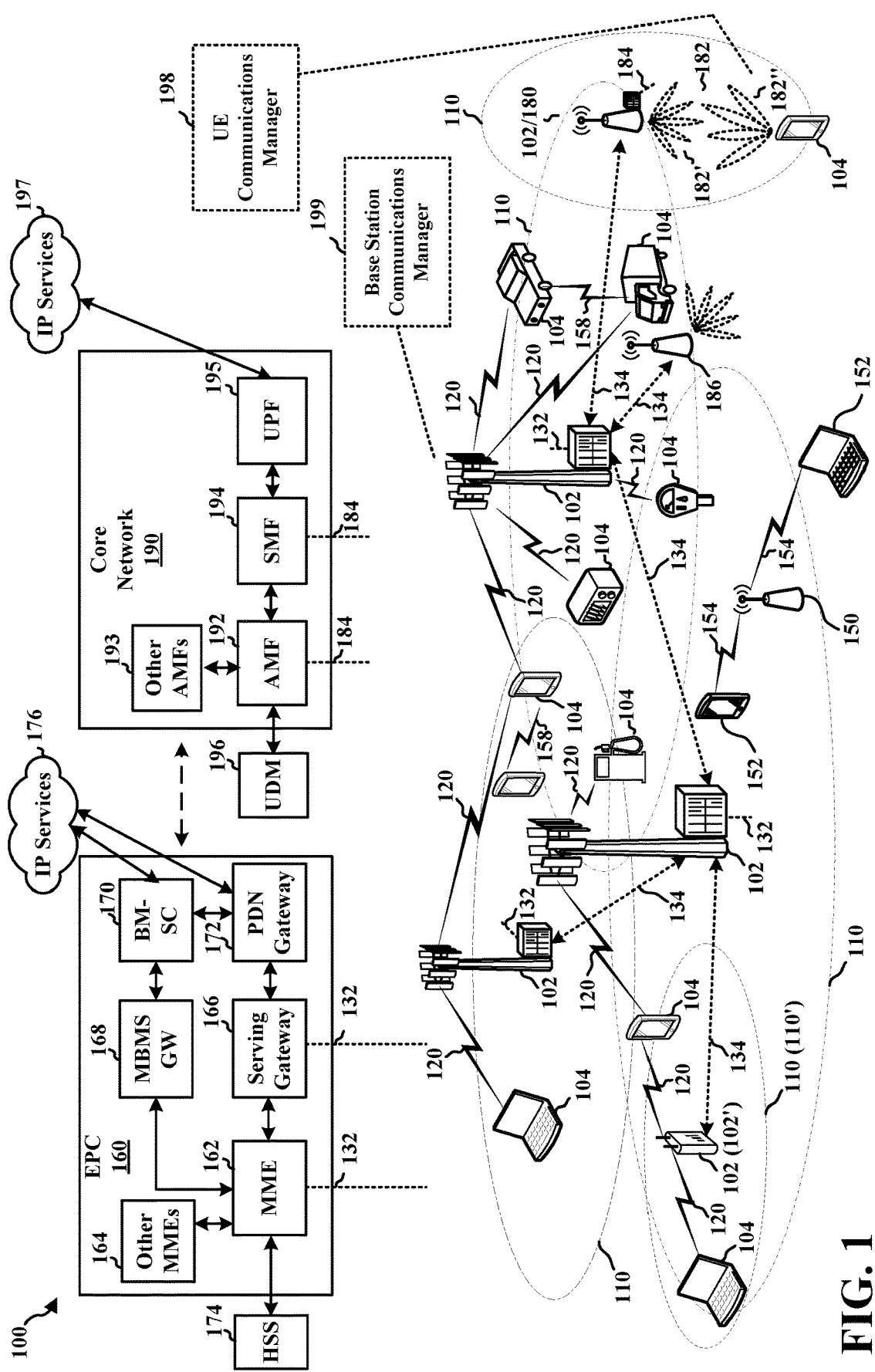
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application, and design constraints imposed on the overall system.

By way of example, an element, or any portion of an element, or any combination of elements may be implemented as a "processing system" that includes one or more processors. Examples of processors include microprocessors, microcontrollers, graphics processing units (OPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects of the present disclosure provide for a user equipment (UE) to report time delays and/or phases of pilot signals received via multiple transmission paths to a base station (e.g., gNB). Based on the report of time delays and/or phases, the base station may pre-equalize future transmissions to the UE, such that future transmission signals received at the UE may sum in a coherent manner. For example, the received transmission signals sum coherently when the signals are summed or combined while in phase (having the same or nearly the same phase and frequency) with each other, thus avoiding signal cancellation/fading and improving receiver performance.

In an aspect, the UE may determine a first time delay for receiving a first pilot signal from a base station via a first path and determine a second time delay for receiving a second pilot signal from the base station via a second path. The UE may then generate a report based on the first time delay and the second time delay and send the report to the base station. In response, the UE may receive a pre-equalized multi-transmission-reception point (TRP) signal from the base station via the first path and the second path based on the report. For example, the multi-TRP signal is pre-equalized for transmission based on the report to at least have a same time delay as a shorter one of the first time delay or the second time delay.

In another aspect, a base station (e.g., gNB) may transmit a first pilot signal to a UE via a first transmission path and transmit a second pilot signal to the UE via a second transmission path. The base station may then receive a report from the UE based on a first time delay at which the UE receives the first pilot signal and a second time delay at which the UE receives the second pilot signal. Thereafter, the base station may pre-equalize a multi-transmission-reception point (TRP) signal for transmission via the first transmission path and the second transmission path based on the report. For example, the multi-TRP signal is pre-equalized to at least have a same time delay as a shorter one of the first time delay corresponding to the first transmission path or the second time delay corresponding to the second transmission path. Thereafter, the base station may transmit the pre-equalized multi-TRP signal to the UE via the first transmission path and the second transmission path.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC) or a core network of any other wireless communication technology). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for nonaccess stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Horne Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 G-Hz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz, and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 MHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia. Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (IBS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMP 192 is the control node that processes the signaling between the UEs 104 and the core network 190. Generally, the AMP 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmission-reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE communications manager 198 that may be configured to receive a first pilot signal from a base station (e.g., BS 102) via a first transmission path (e.g., first transmission-reception point (TRP) 180) and receive a second pilot signal from the base station via a second transmission path (e.g., second TRP 186). The UE communications manager 198 may further be configured to determine a first time delay for receiving the first pilot signal via the first transmission path, determine a second time delay for receiving the second pilot signal via the second transmission path, determine a first phase of the first pilot signal received via the first transmission path, determine a second phase of the second pilot signal received via the second transmission path, determine a first amplitude of the first pilot signal received via the first transmission path, and/or determine a second amplitude of the second pilot signal received via the second transmission path. The UE communications manager 198 may further be configured to generate a report based on at least one of the first time delay, the second time delay, the first phase, the second phase, the first amplitude, or the second amplitude, send the report to the base station, and receive a multi-TRP signal from the base station via the first transmission path and the second transmission path, wherein the multi-TRP signal is pre-equalized for transmission via at least one of the first transmission path or the second transmission path based on the report.

Referring again to FIG. 1, in certain aspects, the base station 102 may include a base station communications manager 199 that may be configured to transmit a first pilot signal to a UE (e.g., UE 104) via a first transmission path (e.g., first transmission-reception point (TRP) 180), transmit a second pilot signal to the UE via a second transmission path (e.g., second TRP 186), and receive a report from the UE based on at least one of a first time delay at which the UE receives the first pilot signal, a second time delay at which the UE receives the second pilot signal, a first phase at which the UE receives the first pilot signal via the first transmission path, a second phase at which the UE receives the second pilot signal via the second transmission path, a first amplitude of the first pilot signal received by the UE via the first transmission path, or a second amplitude of the second pilot signal received by the UE via the second transmission path. The base station communications manager 199 may further be configured to pre-equalize a multi-TRP signal for transmission via the first transmission path and the second transmission path based on the report, and transmit the multi-TRP signal to the UE via the first transmission path and the second transmission path. Although the following description may be focused on 5G NR, the concepts described herein may be applicable to other similar areas, such as UE, LTE-A, CDMA, GSM, and other wireless technologies.

Figure 2B:
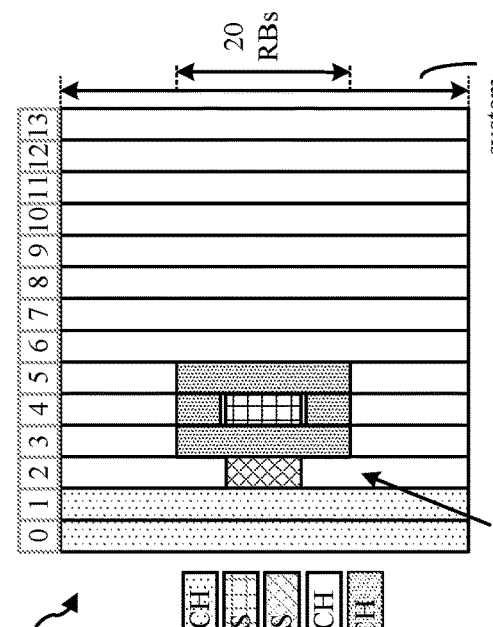
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2D:
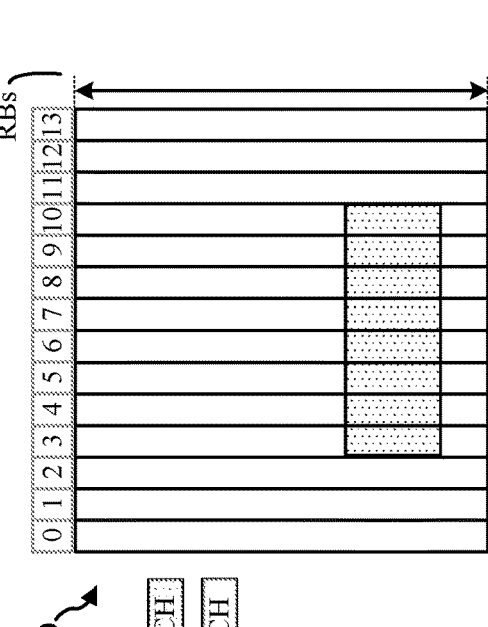
Figure 2A:
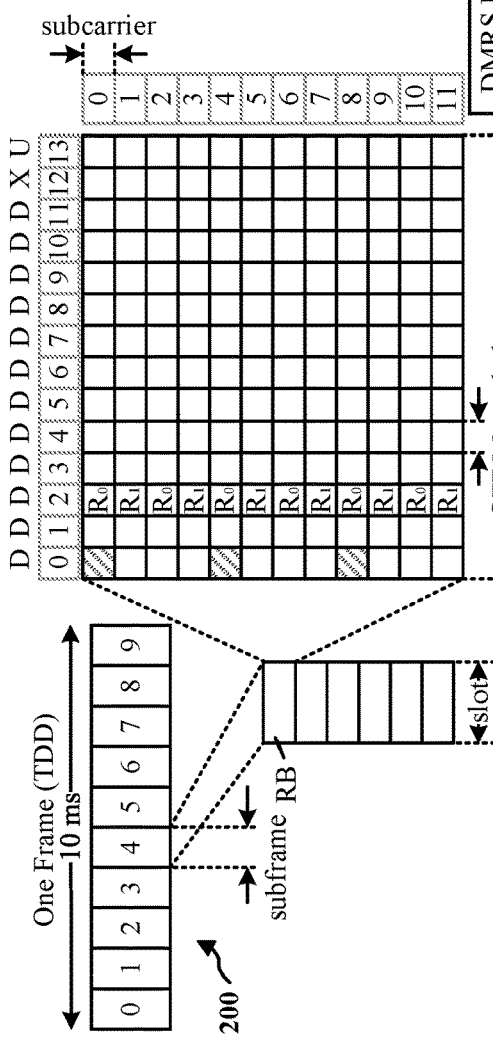
Figure 2C:
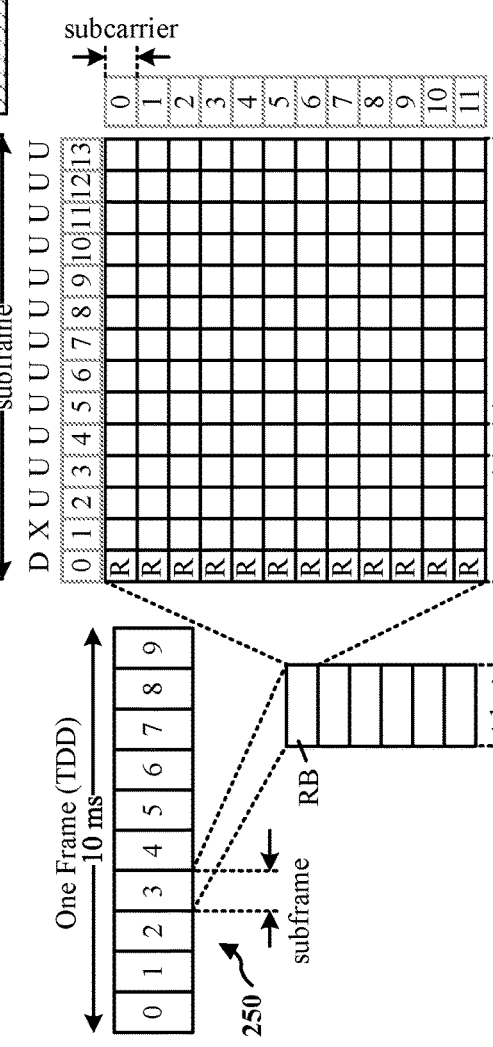

FIG. 2A is a diagram 200 illustrating an example of a first subframe within a radio frame structure 5G/NR frame structure). FIG. 2B is a diagram 230 illustrating an example of DL channels within a subframe (e.g., 5G/NR subframe). FIG. 2C is a diagram 250 illustrating an example of a second subframe within a radio frame structure (e.g., 5G/NR frame structure). FIG. 2D is a diagram 280 illustrating an example of UL channels within a subframe (e.g., 5G/NR subframe). The radio frame structure may be FDD in which for a particular set of subcarriers (carrier system bandwith), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the radio frame structure, is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols, UEs are configured with the slot format (dynamically through DL control information (DCI), or semi-statically/statically through radio resource control (RRC) signaling) through a received slot format indicator (SFI). Note that the description info applies also to a radio frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as angle carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
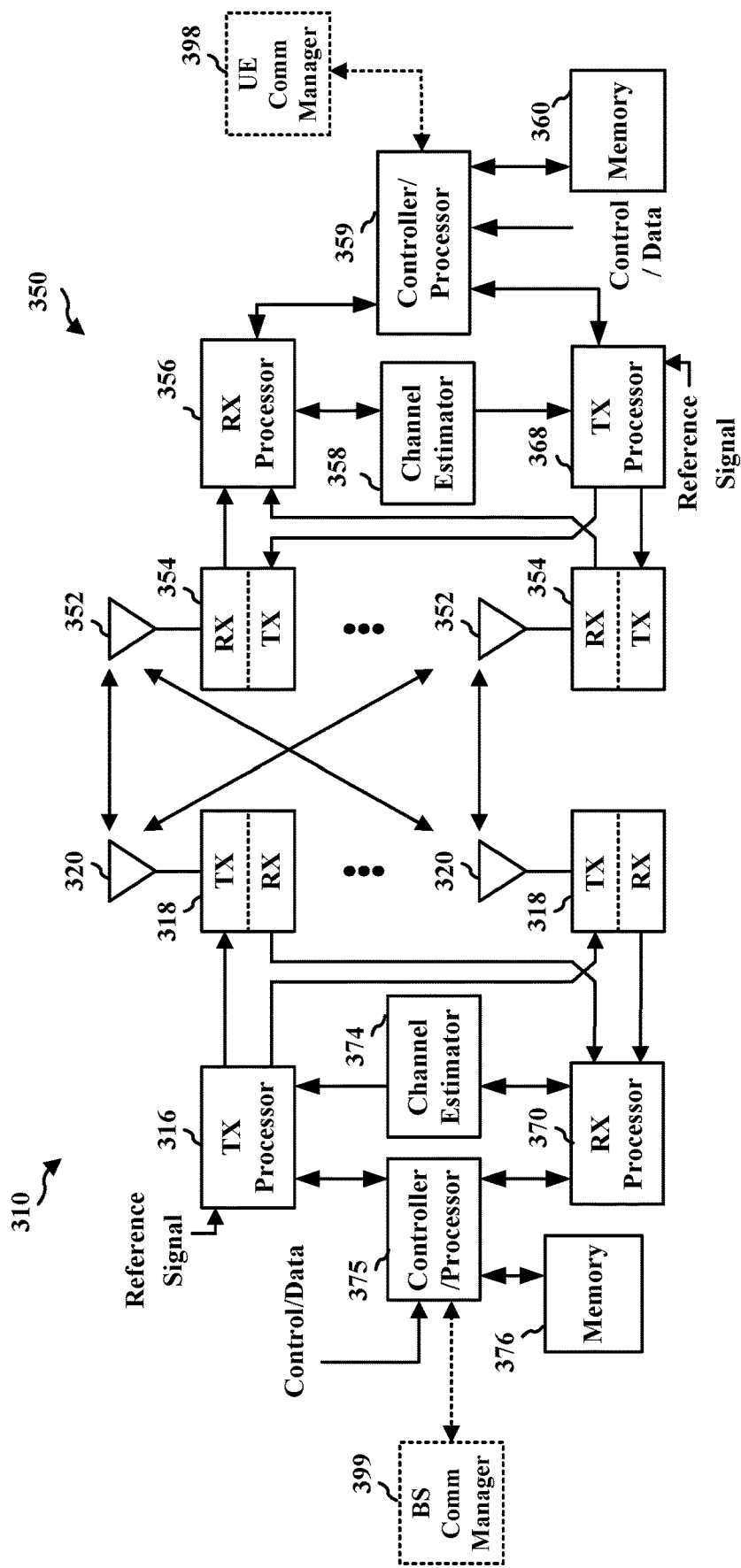
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data, PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams, Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RE carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RE carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or HACK protocol to support HARQ operations.

At least one of the TX processor 368, the RX processor 356, and the controller/processor 359 may be configured to perform aspects in connection with the UE communications manager 198 of FIG. 1. For example, the UE 350 may include a UE communications manager 398 configured to perform the operations described above with respect to the UE communications manager 198 of FIG. 1.

At least one of the TX processor 316, the RX processor 370, and the controller/processor 375 may be configured to perform aspects in connection with the BS communications manager 199 of FIG. 1. For example, the BS 310 may include a BS communications manager 399 configured to perform the operations described above with respect to the BS communications manager 199 of FIG. 1.

Wireless communication via multiple transmission-reception points (TRPs) (multi-TRP) enables the communication of signals on two concurrent streams using a multiplexing technique, such as Spatial Division Multiplexing (SDM), Frequency Division Multiplexing (FDM), or Time Division Multiplexing (TDM). A base station (e.g., gNB) may transmit from multiple panels at the gNB side, or via different collocated TRPs. A UE may receive a transmission from multiple TRPs (multi-TRP transmission).

A UE receiving a signal path from multiple TRPs may receive the transmission in different ways. For example, the UE may receive the multi-TRP transmission via a single panel or via multiple panels at the UE. When a multi-TRP signal is received via one panel at the UE, signals coming from two directions to the same panel will sum in a non-coherent manner. That is, the signals will sum at the UE without being in phase (not having the same or nearly the same phase and frequency) with each other. The signals will appear as one aggregate channel at the UE. Thus, if the two signal paths are received with different delays, the UE will perceive a single time-dispersive channel (a single temporally distorted channel).

On the other hand, if the UE receives the multi-TRP signal via multiple panels at the UE, a multi-stream MIMO operation, which improves spectral efficiency, may be implemented. To enable MIMO, each panel (stream) may have a separate pair of Rx chains (one per polarization). For example, each TRP may transmit from horizontal and vertical antenna polarizations. A horizontal antenna polarization refers to a TRP having horizontal antenna elements that allow the TRP to pick up and radiate horizontally polarized signals, i.e., electromagnetic waves with the electric field in the horizontal plane. A vertical antenna polarization refers to the TRP having vertical antenna elements that allows the TRP to pick up and radiate vertically polarized signals, i.e., electromagnetic waves with the electric field in the vertical plane. Thus, a current millimeter wave communication design may support up to two Rx chains, one Rx chain for horizontal polarization and another Rx chain for vertical polarization. However, low cost/low complexity UEs may be unable to enable multiple pairs of Rx chains for FR2 since the cost of implementing additional Rx chains may be prohibitive. Thus, although the multiple panels at the UE can be used to increase the number of MIMO streams, if the UE cannot support multiple pairs of Rx chains for each of the multiple panels, the multi-TRP signals received via the multiple panels may still sum in a non-coherent manner.

Aspects of the disclosure enable a technique for a UE to report at least a time offset or a phase offset of/between different TRP signals. For example, the time offset may refer to a difference between time delays at which the different TRP signals are received at the UE, and the phase offset may refer to a difference between phases at which the different TRP signals are received at the UE. Using the report, a gNB can pre-equalize a future multi-TRP transmission to the UE. For example, the gNB may pre-equalize a multi-TRP transmission by pre-processing signals corresponding to the multi-TRP transmission so that the signals transmitted to the UE via different TRPs will arrive at the UE at the same time. Additionally or alternatively, the gNB may pre-equalize the multi-TRP transmission by pre-processing the signals corresponding to the multi-TRP transmission so that the signals transmitted to the UE via the different TRPs will arrive at the UE in phase (having the same phase and frequency) with each other. The pre-equalized transmission will result in coherent (or near coherent) summation (signals from different TRPs will sum while in phase with each other) and reduced time dispersity (reduced temporal distortion) for a single layer transmission. For example, the UE may report the time offset and/or phase offset of a main channel tap (main communication path) for each one of the TRP channels (or report the time/phase offset between different TRP channels). The UE may do so to inform the gNB of the time delay of the strongest channel tap (main channel tap or strongest communication path) among each one of the channels coming from the TRPs, and the phase offset between them. By reporting such information to the gNB, the gNB can pre-equalize a future multi-TRP transmission to the UE. For example, if a signal transmitted via a first TRP is received by the UE an amount of time (e.g., 1 microsecond) later than another signal received by the UE via a second TRP, then the gNB may pre-equalize the transmission by adjusting/delaying a future signal transmitted via the second TRP so that all future signals transmitted via the first TRP and the second TRP will be received by the UE at the same time. By reducing the time-dispersiveness of the channel as described above, along with aligning the phases of the multi-TRP signals correctly, the multi-TRP signals may sum in a coherent manner, and therefore, improve performance.

Pre-coding (e.g., to maximize spectral efficiency) at the gNB may be enabled by the UE reporting one of a number of preceding matrices chosen from a codebook. However, such a technique does not allow for the UE to report time or phase information with respect to signals (channels) transmitted from different TRPs. Accordingly, aspects of the disclosure provide a mechanism for the UE to report the time and/or phase information of the signals transmitted from the different TRPs in order for future received transmission signals to sum coherently (e.g., sum while the signals are in phase (same or nearly the same phase and frequency) with each other) at the UE using a single Rx chain (whether the transmission signals are received via a single panel or multiple panels at the UE). The reporting mechanism enables the gNB to pre-equalize multi-TRP paths, which results in near coherent summation in mmW (FR2) at the UE, and thus, improved performance (e.g., approximately 2 to 3 dB). Moreover, the reporting mechanism allows for the channel to be less time-dispersive, which results in smaller channel estimation error that further improves performance.

Figure 4:
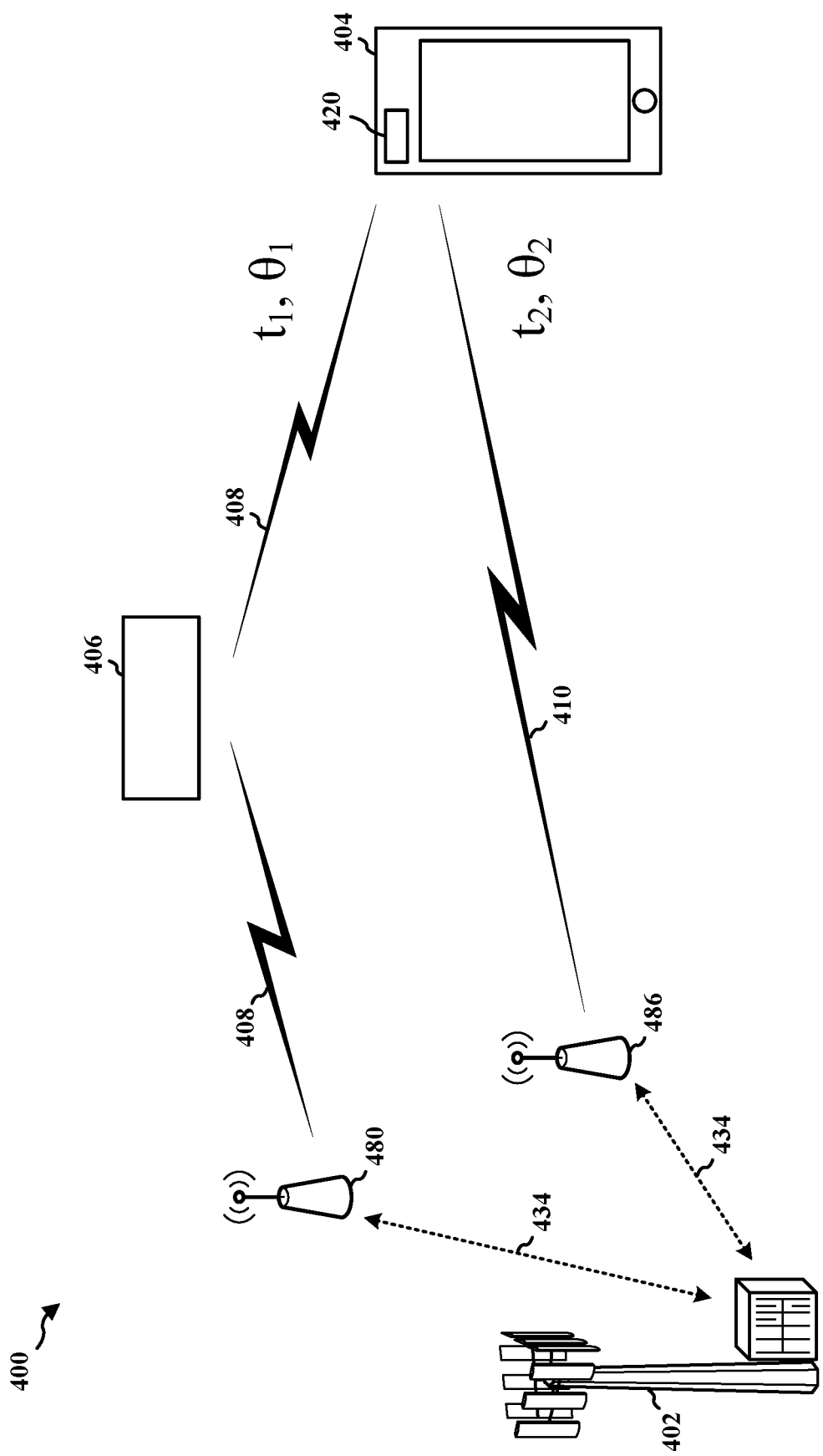
FIG. 4 illustrates an example transmission of a gNB transmitting via two transmission-reception points (TRPs) to a single panel of a UE in accordance with aspects of the present disclosure.

FIG. 4 illustrates an example transmission 400 of a gNB 402 transmitting via two TRPs 480, 486 to a UE 404. As shown, a first TRP 480 and a second TRP 486 communicate with the gNB 402 over backhaul links 434. A first signal 408 transmitted via a first transmission path (e.g., via the first TRP 480) and a second signal 410 transmitted via a second transmission path (e.g., via the second TRP 486) arrive at a single panel 420 at the UE 404 from two distinct directions. Prior to the first signal 408 arriving at the UE 404, the first signal 408 may bounce/reflect off of a reflector 406. The first signal 408 may arrive at the UE 404 with a first time delay/offset $t_1$ and a first phase $\theta_1$. The second signal 410 may arrive at the UE 404 with a second time delay/offset $t_2$ and a second phase $\theta_2$.

The scenario depicted in Ha 4 may apply to a two-stream AMMO operation. The two-stream MIME) operation may be implemented in the UE 404 if the UE has two phased-array analog beam formers using the same antenna elements. However, the UE 404 may not include such components due to the cost and losses involved with having these components. Accordingly, the UE 404 may either choose a best beam direction or receive a beam concurrently at both directions. In either case, summation of the first signal 408 and the second signal 410 post-analog beam forming may not be coherent (the signals are summed while not in phase with each other) and may result in a time-dispersive channel (temporally distorted channel).

Aspects of the disclosure involve the UE 404 reporting the time delay and phase of the first signal 408 ($t_1$, $\theta_1$) and the time delay and phase of the second signal 410 ($t_2$, $\theta_2$) to the gNB 402. In some aspects, the UE 404 may report other information, such as a difference between $t_1$ and $t_2$, which of the two signals has a longer time delay, a phase difference, and/or amplitudes of the signals. The gNB 402 may then use this information to pre-equalize a future signal transmission to the UE 404 communicated via the first transmission path (first TRP 480) and the second transmission path (second TRP 486). After pre-equalization, the paths at the UE will combine almost coherently because each path is nearly a single tap in mmW.

Figure 5:
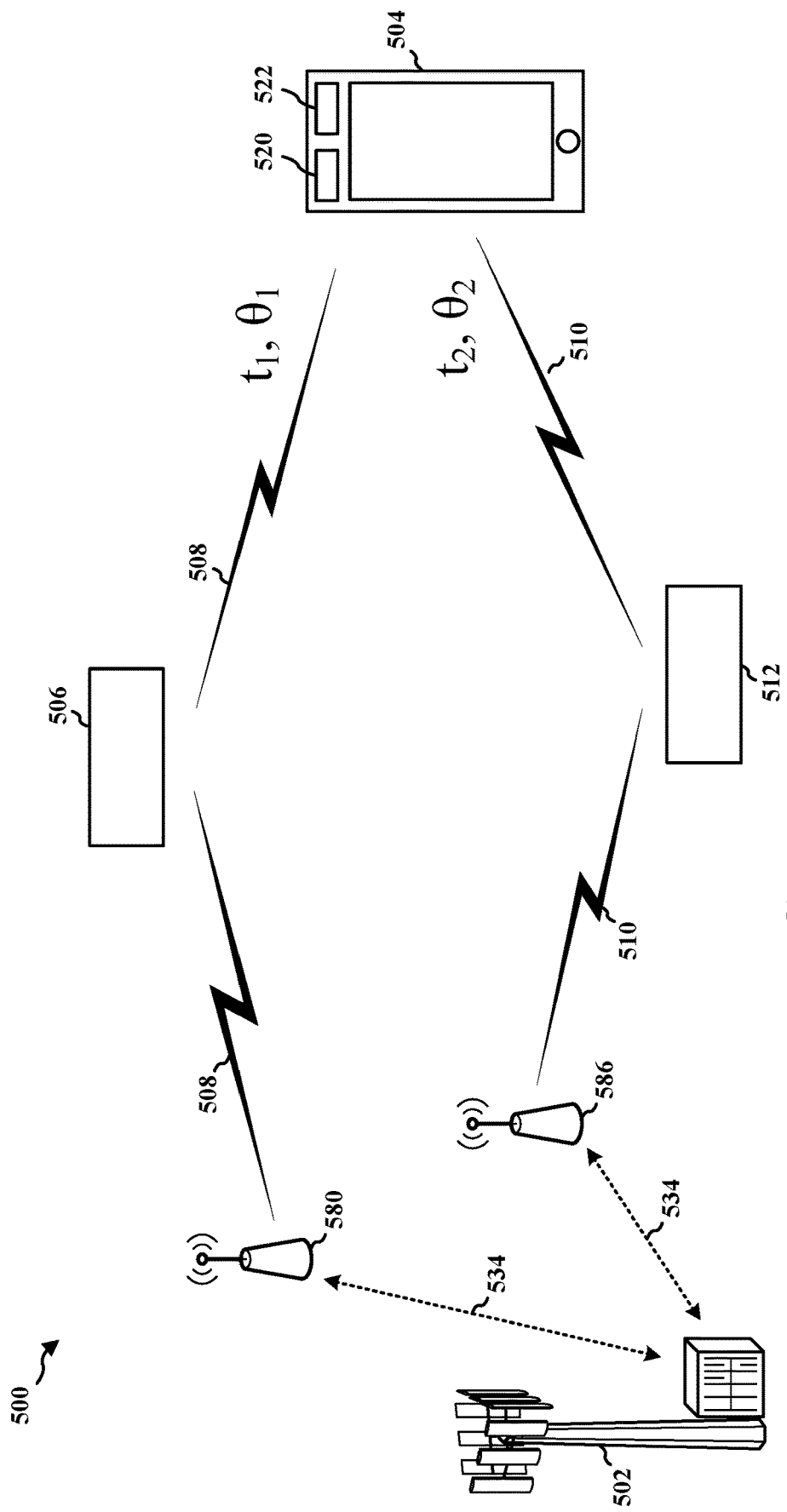
FIG. 5 illustrates an example transmission of a gNB transmitting via two TRPs to multiple panels of a UE in accordance with aspects of the present disclosure.

FIG. 5 illustrates an example transmission 500 of a gNB 502 transmitting via two TRPs 580, 586 to a UE 504. As shown, a first TRP 580 and a second TRP 586 communicate with the gNB 502 over backhaul links 534. A first signal 508 transmitted via a first transmission path (e.g., via the first TRP 580) and a second signal 510 transmitted via a second transmission path (e.g., via the second TRP 586) arrive at multiple panels 520, 522 at the UE 504 from two distinct directions. Prior to the first signal 508 arriving at the UE 504, the first signal 508 may bounce/reflect off of a first reflector 506. Prior to the second signal 510 arriving at the UE 504, the second signal 510 may bounce/reflect off of a second reflector 512. The first signal 508 may arrive at the UE 504 with a first time delay/offset $t_1$ and a first phase $\theta_1$. The second signal 510 may arrive at the UE 504 with a second time delay/offset $t_2$ and a second phase $\theta_2$.

The scenario depicted in FIG. 5 may apply to a two-stream MIMO operation. The two-stream MIMO operation may be implemented in the UE 504 if the UE has different Rx chains per panel (e.g., 4 Rx chains—2 polarizations for each of panels 520 and 522). For low complexity/category UEs, the cost of extra Rx chains may be prohibitive. Thus, the UE 504 may not include such components due to cost. Accordingly, the UE 504 may either choose a best beam/panel or receive from both panels concurrently. In either case, summation of the first signal 508 and the second signal 510 post-analog beam forming will not be coherent (the signals are summed while not in phase with each other) and may result in a time-dispersive channel (temporally distorted channel).

Aspects of the disclosure involve the UE 504 reporting the time delay and phase of the first signal 508 ($t_1$, $\theta_1$) (e.g., received via a first panel 520) and the time delay and phase of the second signal 510 ($t_2$, $\theta_2$)) (e.g., received via a second panel 522) to the gNB 502. In some aspects, the UE 504 may report other information, such as a difference between $t_1$ and $t_2$, which of the two signals has a longer time delay, a phase difference, and/or amplitudes of the signals. The gNB 502 may then use this information to pre-equalize a future signal transmission to the UE 504 communicated via the first transmission path (first TRP 580) and the second transmission path (second TRP 586). After pre-equalization, the paths at the UE will combine almost coherently because each path is nearly a single tap in mmW.

Figure 6A:
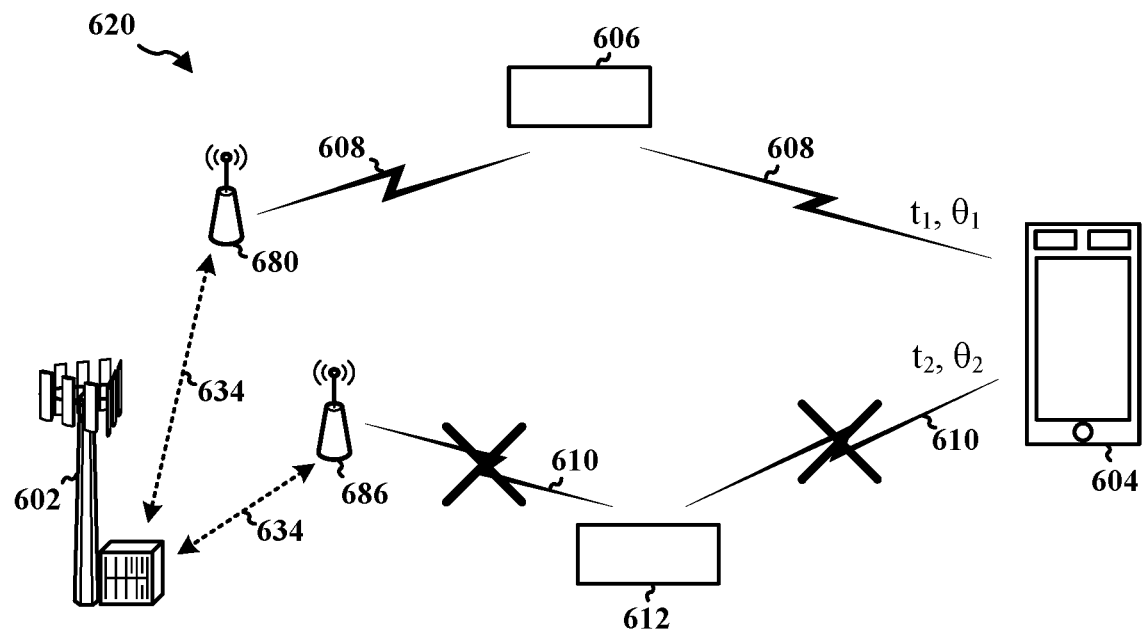
FIGS. 6A and 6B illustrate example UE reporting mechanisms in accordance with aspects of the present disclosure.
Figure 6B:
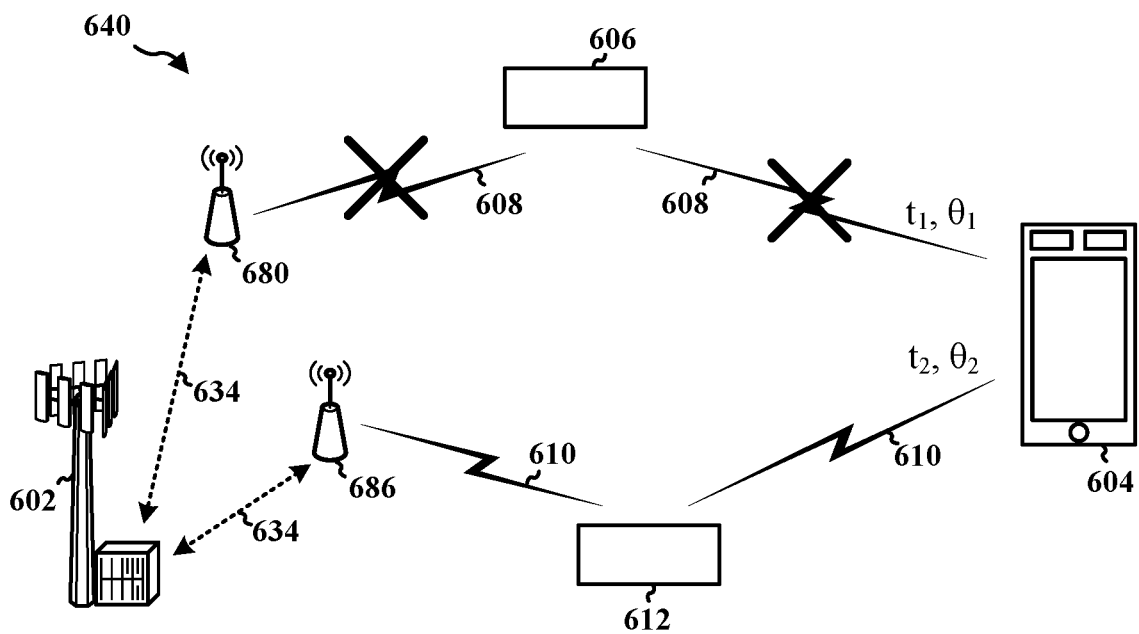

FIGS. 6A and 6B illustrate example UE reporting mechanisms. As shown in FIGS. 6A and 6B, a gNB 602 communicates with a first TRP 680 and a second TRP 586 over backhaul links 534. In order for a UE 604 to estimate a time delay and phase of each transmission path (first transmission path 608 via first TRP 680 and second transmission path 610 via second TRP 686), the gNB 602 may transmit pilot signals using each path at different times (TDD). For example, referring to FIG. 6A, during a first pilot transmission time 620, the gNB 602 may transmit pilot signals on the first transmission path 608 (via the first TRP 680) while forgoing to transmit pilot signals on the second transmission path 610. Prior to the pilot signals arriving at the UE 604, the pilot signals may bounce/reflect off of a first reflector 606.

Upon receiving the pilot signals via the first transmission path 608, the UE 604 will estimate the time delay and phase ($t_1$, $\theta_1$) of the path and generate a report based on such information. The UE 604 will then send the report to the gNB 602 as directed by the gNB 602.

Referring to FIG. 6B, during a second pilot signal transmission time 640, the gNB 602 may transmit pilot signals on the second transmission path 610 (via the second TRP 686) while forgoing to transmit pilot signals on the first transmission path 608. Prior to the pilot signals arriving at the UE 604, the pilot signals may bounce/reflect off of a second reflector 612. Upon receiving the pilot signals via the second transmission path 610, the UE 604 will estimate the time delay and phase ($t_2$, $\theta_2$) of the path and generate a report based on such information. The UE 604 will then send the report to the gNB 602 as directed by the gNB 602.

In an aspect, to generate the report, the UE 604 may measure the different time delays and phases of the main channel component (main tap or communication path) of each TRP. This may be accomplished in a number of ways. For example, the gNB 602 may transmit to the UE 604 pilot signals for each TRP using TDM. Accordingly, the UE 604 may receive the pilot signals from the two TRPS in different OFDM symbols and separately estimate their channels to determine the time delay and phase of each transmission path. In another example, the gNB 602 may transmit the pilot signals for each TRP at the same time (e.g., in the same OFDM symbol) but with a cyclic delay (e.g., half symbol delay) between the two sets of pilot signals. As such, the UE 604 may receive the channel responses of the two TRPs in the same OFDM symbol but will be able to separate them during UE processing to determine the time delay and phase of each transmission path.

In an aspect, using any one of the methods described above to estimate the delay and phase of the main channel components transmitted from the different TRPs (whether for a single panel or multiple panels), the UE 604 can generate a report. Generation and/or transmission of the report may be initiated by the gNB 602 (e.g. via a downlink control information (DCI) transmission or other signaling mechanism). The UE 604 may transmit the report to the gNB 602 over PUCCH or PUSCH.

Figure 7:
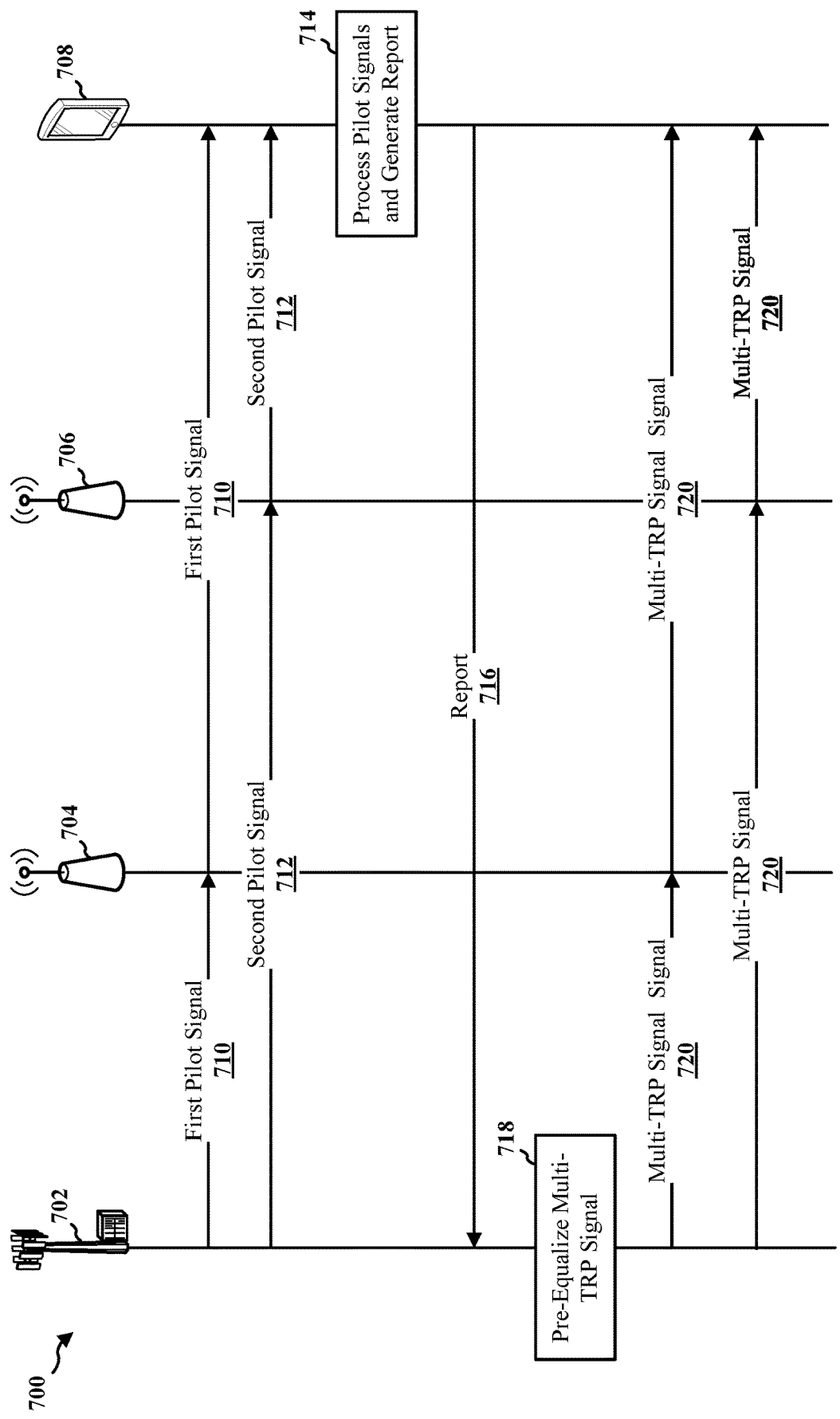
FIG. 7 is a signal flow diagram illustrating a UE reporting to a base station (e.g., gNB) time delays, phases, and/or amplitudes of pilot signals received via multiple transmission paths in order for the base station to pre-equalize a future transmission to the UE in accordance with aspects of the present disclosure.

FIG. 7 is a signal flow diagram 700 illustrating a UE reporting to a base station (e.g., gNB) time delays, phases, and/or amplitudes of pilot signals received via multiple transmission paths in order for the base station to pre-equalize a future transmission to the UE. In an aspect, a base station 702 may transmit a first pilot signal 710 to a UE 708 via a first transmission path (e.g., via a first transmission-reception point (TRP) 704). The base station 702 may further transmit a second pilot signal 712 to the UE 708 via a second transmission path (e.g., via a second TRP 706). In an aspect, the first pilot signal 710 and the second pilot signal 712 may be transmitted in different symbols. In another aspect, the first pilot signal 710 and the second pilot signal 712 may be transmitted in a same symbol, wherein the second pilot signal 712 has a cyclic delay with respect to the first pilot signal 710.

At 714, the UE 708 may process the received pilot signals. For example, the UE 708 may determine a time delay (e.g., $t_1$) for receiving the first pilot signal 710 from the base station 702 via the first TRP 704 and a time delay (e.g., $t_2$) for receiving the second pilot signal 712 from the base station 702 via the second TRP 706. Additionally and/or alternatively, the UE 708 may determine a phase (e.g., $\theta_1$) and/or amplitude at which the UE 708 receives the first pilot signal 710 via the first TRP 704 and a second phase (e.g., $\theta_2$)

and/or amplitude at which the UE 708 receives the second pilot signal 712 via the second TRP 706. Thereafter, the UE 708 may generate a report 716 based on the determined information. For example, the report may include an indication of the first e delay and the second time delay. In another example, the report may include a time difference between the first time delay and the second time delay, and an indication of whether the first transmission path or the second transmission path has a longer time delay. In other examples, the report may also include the first phase and the second phase (or a phase difference between the first phase and the second phase) and/or the first amplitude and the second amplitude. The UE 708 may send the report 716 to the base station 702. (e.g., when triggered by DCI or other signaling).

At 718, the base station 702 may pre-equalize a multi-transmission-reception point (TRP) signal 720 for transmission via the first transmission path (first TRP 704) and the second transmission path (second TRP 706) based on the report. For example, the multi-TRP signal may be pre-equalized to have a same time delay as a shorter one of the first time delay corresponding to the first transmission path or the second time delay corresponding to the second transmission path. Additionally and/or alternatively, the multi-TRP signal may be pre-equalized to have a same phase as one of the first phase or the second phase and/or have a same amplitude as one of the first amplitude or the second amplitude. The base station 702 may then send the pre-equalized multi-TRP signal 720 to the UE 708 via the first transmission path (first TRP 704) and the second transmission path (second TRP 706).

Figure 8:
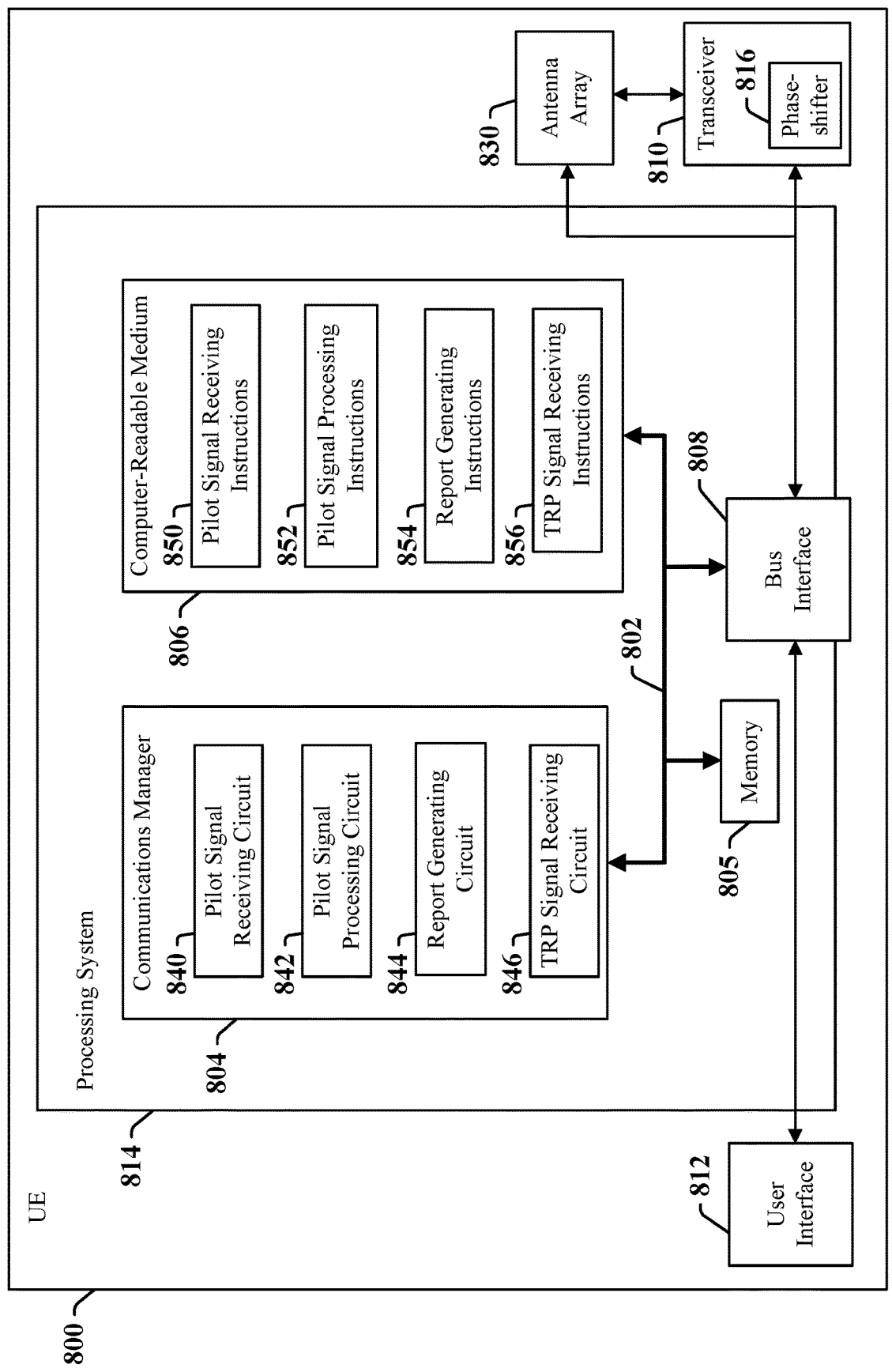
FIG. 8 is a block diagram illustrating an example of a hardware implementation for an exemplary UE employing a processing system in accordance with aspects of the present disclosure.

FIG. 8 is a block diagram illustrating an example of a hardware implementation for an exemplary UE 800 employing a processing system 814. For example, the UE 800 may be a UE, as illustrated in any one or more of FIGS. 1 and 3-7. The UE 800 may be implemented with a processing system 814 that includes one or more processors 804 (e.g., communications manager). Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in a UE 800, may include the UE communications manager 198/398 and used to implement any one or more of the processes and procedures described below and illustrated in FIGS. 9 and 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. In some examples, the transceiver 810 may include a phase-shifter 816 for digital and/or analog beamforming via one or more antenna array(s) 830. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 (e.g., UE communications manager 198/398) may include pilot signal receiving circuitry 840 configured for various functions, including, for example, receiving a first pilot signal via a first transmission path (first TRP) and receiving a second pilot signal via a second transmission path (second TRP). For example, the pilot signal receiving circuitry 840 may be configured to implement one or more of the functions described below in relation to FIG. 9, including, e.g., block 902, and in relation to FIG. 10, e.g., block 1002. The processor 804 may also include pilot signal processing circuitry 842 configured for various functions, including, for example, determining a first time delay (and first phase and/or first amplitude) for receiving a first pilot signal from a base station via a first transmission path and determining a second time delay (and second phase and/or second amplitude) for receiving a second pilot signal from the base station via a second transmission path. For example, the pilot signal processing circuitry 842 may be configured to implement one or more of the functions described below in relation to FIG. 9, including, e.g., block 904, and in relation to FIG. 10, including, e.g., block 1004. The processor 804 may also include report generating circuitry 844 configured for various functions, including, for example, generating a message (e.g., report) based on the first time delay (and the first phase and/or the first amplitude) and the second time delay (and the second phase and/or the second amplitude), and sending the message to the base station. For example, the report generating circuitry 844 may be configured to implement one or more of the functions described below in relation to FIG. 9, including, e.g., blocks 906 and 908, and in relation to FIG. 10, including, e.g., blocks 1006 and 1008. The processor 804 may also include TRP signal receiving circuitry 846 configured for various functions, including, for example, receiving a multi-transmission-reception point (TRP) signal from the base station via the first transmission path and the second transmission path. For example, the TRP signal receiving circuitry 846 may be configured to implement one or more of the functions described below in relation to FIG. 9, including, e.g., block 910, and in relation to FIG. 10, including, e.g., block 1010.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system tray execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include pilot signal receiving instructions 850 configured for various functions, including, for example, receiving a first pilot signal via a first transmission path (first TRP) and receiving a second pilot signal via a second transmission path (second TRP). For example, the pilot signal receiving instructions 850 may be configured to implement one or more of the functions described below in relation to FIG. 9, including, e.g., block 902, and in relation to FIG. 10, e.g., block 1002. The computer-readable storage medium 806 may also include pilot signal processing instructions 852 configured for various functions, including, for example, determining a first time delay (and first phase and/or first amplitude) for receiving a first pilot signal from a base station via a first transmission path and determining a second time delay (and second phase and/or second amplitude) for receiving a second pilot signal from the base station via a second transmission path. For example, the pilot signal processing instructions 852 may be configured to implement one or more of the functions described below in relation to FIG. 9, including, e.g., block 904, and in relation to FIG. 10, including, e.g., block 1004. The computer-readable storage medium 806 may also include report generating instructions 854 configured for various functions, including, for example, generating a message (e.g., report) based on the first time delay (and the first phase and/or the first amplitude) and the second time delay (and the second phase and/or the second amplitude), and sending the message to the base station. For example, the report generating instructions 854 may be configured to implement one or more of the functions described below in relation to FIG. 9, including, e.g., blocks 906 and 908, and in relation to FIG. 10, including, e.g., blocks 1006 and 1008. The computer-readable storage medium 806 may also include TRP signal receiving instructions 856 configured for various functions, including, for example, receiving a multi-transmission-reception point (TRP) signal from the base station via the first transmission path and the second transmission path. For example, the TRP signal receiving instructions 856 may be configured to implement one or more of the functions described below in relation to FIG. 9, including, e.g., block 910, and in relation to FIG. 10, including, e.g., block 1010.

Figure 9:
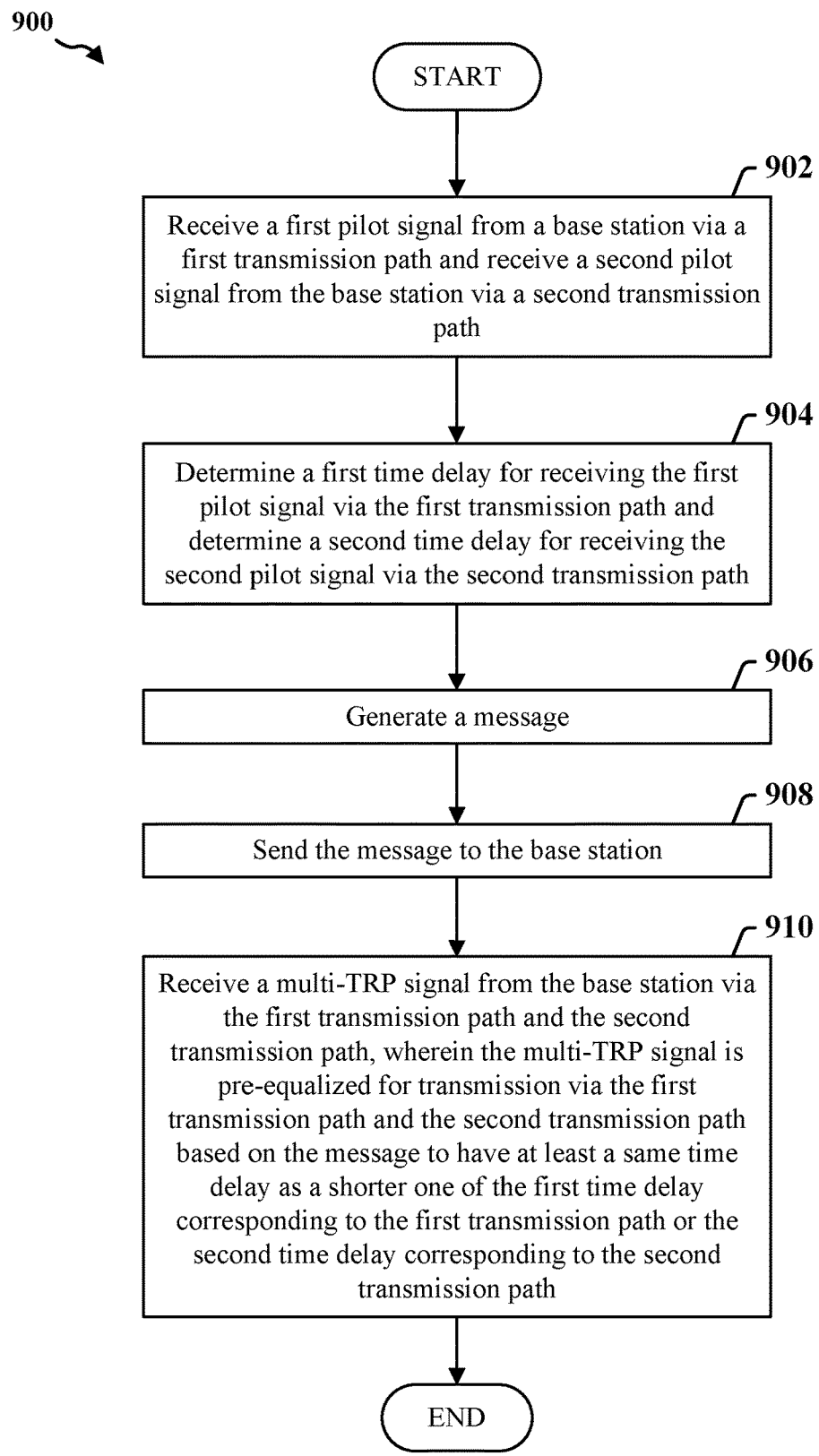
FIG. 9 is a flow chart illustrating an exemplary process for reporting to a base station (e.g., gNB) time delays of signals received via multiple transmission paths in accordance with aspects of the present disclosure.

FIG. 9 is a flow chart illustrating an exemplary process 900 for reporting to a base station (e.g., gNB) time delays of signals received via multiple transmission paths (e.g., multiple transmission-reception points (TRPS)) in accordance with aspects of the present disclosure. As described below, some or all illustrated features may be omitted in a particular implementation within the scope of the present disclosure, and some illustrated features may not be required for implementation of all aspects. In some examples, the process 900 may be carried out by the UE 800 illustrated in FIG. 8, which may be a UE, as illustrated in any one or more of FIGS. 1 and 3-7. In some examples, the process 900 may be carried out by any suitable apparatus or means for carrying out the functions or algorithm described below.

At block 902, the UE receives a first pilot signal from a base station (e.g., gNB) via a first transmission path (e.g., via first transmission path 608 or first TRP 704) and receives a second pilot signal from the base station via a second transmission path (e.g., via second transmission path 610 or second TRP 706). In an aspect, the UE receives the first pilot signal in a first symbol and receives the second pilot signal in a second symbol different from the first symbol. In another aspect, the UE receives the first pilot signal in a same symbol as the second pilot signal and receives the second pilot signal in the same symbol as the first pilot signal, wherein the second pilot signal has a cyclic delay with respect to the first pilot signal.

At block 904, the UE determines a first time delay (e.g., $t_1$) for receiving the first pilot signal from the base station via the first transmission path and determines a second time delay (e.g., $t_2$) for receiving the second pilot signal from the base station via the second transmission path.

At block 906, the UE generates a message (e.g., report) based on the first time delay and the second time delay. In an aspect, the UE generating the message includes the UE indicating the first time delay and the second time delay in the message. In another aspect, the UE generating the message includes the UE determining a time difference between the first time delay and the second time delay, determining whether the first transmission path or the second transmission path has a longer time delay based on the first time delay and the second time delay, and indicating, in the message, the time difference and whether the first transmission path or the second transmission path has the longer time delay.

At block 908, the UE sends the message to the base station. At block 910, the UE receives a multi-transmission-reception point (TRP) signal from the base station via the first transmission path and the second transmission path. The multi-TRP signal is pre-equalized (by the base station) for transmission via the first transmission path and the second transmission path based on the message (from the UE) to at least have a same time delay as a shorter one of the first time delay corresponding to the first transmission path or the second time delay corresponding to the second transmission path.

In an aspect, at block 904, the UE may further determine a first phase (e.g., $\theta_1$) of the first pilot signal received via the first transmission path and determine a second phase (e.g., $\theta_2$) of the second pilot signal received via the second transmission path, and when generating the message at block 906, the UE may further indicate the first phase and the second phase in the message. Alternatively, at block 904, the UE may further determine a phase difference between the first phase and the second phase, and when generating the message at block 906, the UE may further indicate the phase difference in the message. Accordingly, at block 910, the multi-TRP signal may further be pre-equalized for transmission via the first transmission path and the second transmission path based on the message to have a same phase as one of the first phase or the second phase.

In another aspect, at block 904, the UE may further determine a first amplitude of the first pilot signal received via the first transmission path and determine a second amplitude of the second pilot signal received via the second transmission path, and when generating the message at block 906, the UE may further indicate the first amplitude and the second amplitude, in the message. Accordingly, at block 910, the multi-TRP signal may further be pre-equalized for transmission via the first transmission path and the second transmission path based on the message to have a same amplitude as one of the first amplitude or the second amplitude.

In one configuration, the UE 800 for wireless communication includes means (e.g., pilot signal receiving circuitry 840) for receiving a first pilot signal from a base station via a first transmission path, means (e.g., pilot signal receiving circuitry 840) for receiving a second pilot signal from a base station via a second transmission path, means (e.g., pilot signal processing circuitry 842) for determining a first time delay (and a first phase and/or a first amplitude) for receiving the first pilot signal from the base station via the first transmission path, means (e.g., pilot signal processing circuitry 842) for determining a second time delay (and a second phase and/or a second amplitude) for receiving the second pilot signal from the base station via the second transmission path, means (e.g., report generating circuitry 844) for generating a message (e.g., report) based on the first time delay (and first phase and/or first amplitude) and the second time delay (and second phase and/or second amplitude), means (e.g., report generating circuitry 844) for sending the message to the base station, and means (e.g., TRP signal receiving circuitry 846) for receiving a multi-transmission-reception point (TRP) signal from the base station via the first transmission path and the second transmission path, wherein the multi-TRP signal is pre-equalized for transmission via the first transmission path and the second transmission path based on the message (e.g., to at least have a same time delay as a shorter one of the first time delay corresponding to the first transmission path or the second time delay corresponding to the second transmission path). In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1 and 3-7 and utilizing, for example, the processes and/or algorithms described herein in relation to FIG. 9.

Figure 10:
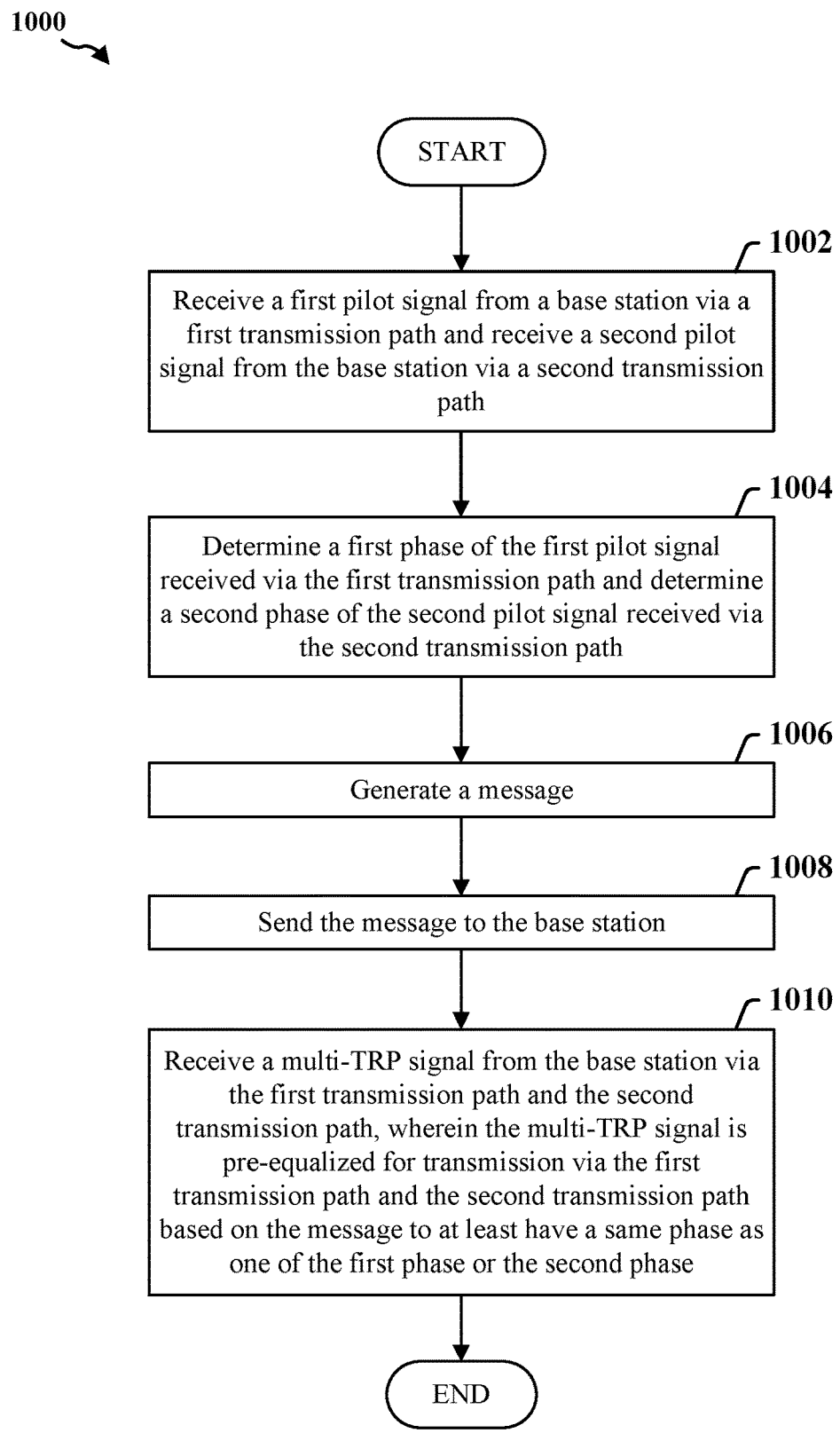
FIG. 10 is a flow chart illustrating an exemplary process for reporting to a base station (e.g., gNB) phases of signals received via multiple transmission paths in accordance with aspects of the present disclosure.

FIG. 10 is a flow chart illustrating an exemplary process 1000 for reporting to a base station (e.g., gNB) phases of signals received via multiple transmission paths multiple transmission-reception points (TRPs)) in accordance with aspects of the present disclosure. As described below, some or all illustrated features may be omitted in a particular implementation within the scope of the present disclosure, and some illustrated features may not be required for implementation of all aspects. In some examples, the process 1000 may be carried out the UE 800 illustrated in FIG. 8, or a UE as illustrated in any one or more of FIGS. 1 and 3-7. In some examples, the process 1000 may be carried out by any suitable apparatus or means for carrying out the functions or algorithm described below.

At block 1002, the UE receives a first pilot signal from a base station (e.g., gNB) via a first transmission path (e.g., via first transmission path 608 or first TRP 704) and receives a second pilot signal from the base station via a second transmission path (e.g., via second transmission path 610 or second TRP 706). In an aspect, the UE receives the first pilot signal in a first symbol and receives the second pilot signal in a second symbol different from the first symbol. In another aspect, the UE receives the first pilot signal in a same symbol as the second pilot signal and receives the second pilot signal in the same symbol as the first pilot signal, wherein the second pilot signal has a cyclic delay with respect to the first pilot signal.

At block 1004, the UE determines a first phase of the first pilot signal received from the base station via the first transmission path and determines a second phase of the second pilot signal received from the base station via the second transmission path.

At block 1006, the UE generates a report (e.g., message) based on the first time phase and the second phase. In an aspect, the UE generating the message includes the UE indicating the first phase and the second phase in the message. In another aspect, the UE generating the message includes the UE determining a phase difference between the first phase and the second phase and indicating the phase difference in the message.

At block 1008, the UE sends the message to the base station. At block 1010, the UE receives a multi-transmission-reception point (TRP) signal from the base station via the first transmission path and the second transmission path. The multi-TRP signal is pre-equalized (by the base station) for transmission via the first transmission path and the second transmission path based on the message (from the UE) to at least have a same phase as one of the first phase or the second phase.

In an aspect, at block 1004, the UE may further determine a first time delay for receiving the first pilot signal via the first transmission path and determine a second time delay for receiving the second pilot signal via the second transmission path, and when generating the message at block 1006, the UE may further indicate the first time delay and the second time delay in the message. Alternatively, at block 1004, the UE may further determine a time difference between the first time delay and the second time delay and determine whether the first pilot signal or the second pilot signal has a longer time delay based on the first time delay and the second time delay, and when generating the message at block 1006, the UE may further indicate in the message, the time difference and whether the first pilot signal or the second pilot signal has the longer time delay. Accordingly, at block 1010, the multi-TRP signal may further be pre-equalized for transmission via the first transmission path and the second transmission path based on the message to have a same time delay as a shorter one of the first time delay corresponding to the first transmission path or the second time delay corresponding to the second transmission path.

In another aspect, at block 1004, the UE may further determine a first amplitude of the first pilot signal received via the first transmission path and determine a second amplitude of the second pilot signal received via the second transmission path, and when generating the message at block 1006, the UE may further indicate the first amplitude and the second amplitude in the message. Accordingly, at block 1010, the multi-TRP signal is further pre-equalized for transmission via the first transmission path and the second transmission path based on the message to have a same amplitude as one of the first amplitude or the second amplitude.

In one configuration, the UE 800 for wireless communication includes means (e.g., pilot signal receiving circuitry 840) for receiving a first pilot signal from a base station via a first transmission path, means (e.g., pilot signal receiving circuitry 840) for receiving a second pilot signal from a base station via a second transmission path, means (e.g., pilot signal processing circuitry 842) for determining a first phase (and a first time delay and/or a first amplitude) of the first pilot signal received from the base station via the first transmission path, means (e.g., pilot signal processing circuitry 842) for determining a second phase (and a second time delay and/or a second amplitude) of the second pilot signal received from the base station via the second transmission path, means (e.g., report generating circuitry 844) for generating a message (e.g., report) based on the first time phase (and first time delay and/or first amplitude) and the second phase (and second time delay and/or second amplitude), means (e.g., report generating circuitry 844) for sending the message to the base station, and means (e.g., TRP signal receiving circuitry 846) for receiving a multi-transmission-reception point TRP) signal from the base station via the first transmission path and the second transmission path, wherein the multi-TRP signal is pre-equalized for transmission via the first transmission path and the second transmission path based on the message (e.g., to at least have a same phase as one of the first phase or the second phase). In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1 and 3-7 and utilizing, for example, the processes and/or algorithms described herein in relation to FIG. 10.

Figure 11:
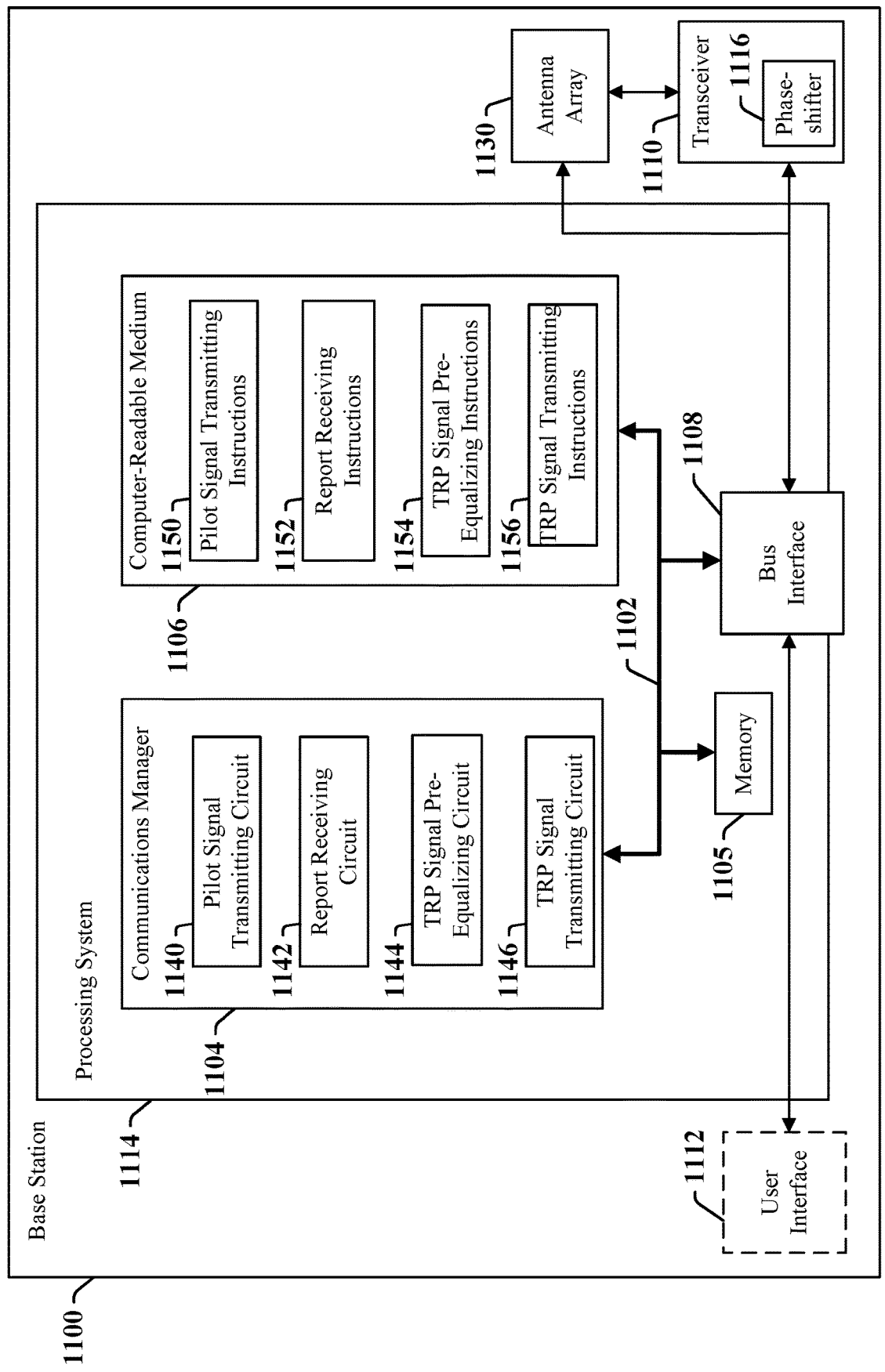
FIG. 11 is a conceptual diagram illustrating an example of a hardware implementation for an exemplary base station employing a processing system in accordance with aspects of the present disclosure.

FIG. 11 is a conceptual diagram illustrating an example of a hardware implementation for an exemplary base station 1100 employing a processing system 1114. In accordance with various aspects of the disclosure, an element, or any portion of an element, or any combination of elements may be implemented with a processing system 1114 that includes one or more processors 1104 (e.g., communications manager). For example, the base station 1100 may be a base station or gNB as illustrated in any one or more of FIGS. 1 and 3-7.

The processing system 1114 may be substantially the same as the processing system 814 illustrated in FIG. 8, including a bus interface 1108, a bus 1102, memory 1105, a processor 1104, and a computer-readable medium 1106. Furthermore, the base station 1100 may include a user interface 1112, a transceiver 1110 (including a phase-shifter 1116), and one or more antenna arrays 1130 substantially similar to those described above in FIG. 8. The processor 1104, as utilized in a base station 1100, may include the BS communications manager 199/399 and used to implement any one or more of the processes described below and illustrated in FIGS. 12 and 13.

In some aspects of the disclosure, the processor 1104 (e.g., BS communications manager 199/399) may include pilot signal transmitting circuitry 1140 configured for various functions, including, for example, transmitting a first pilot signal to a user equipment (UE) via a first transmission path and transmitting a second pilot signal to the UE via a second transmission path. For example, the pilot signal transmitting circuitry 1140 may be configured to implement one or more of the functions described below in relation to FIG. 12, including, e.g., block 1202, and in relation to FIG. 13, including, e.g., block 1302. The processor 1104 may further include report receiving circuitry 1142 configured for various functions, including, for example, receiving a message (e.g., report) from the UE based on a first time delay (and a first phase and/or first amplitude) at which the UE receives the first pilot signal and a second time delay (and a second phase and/or second amplitude) at which the UE receives the second pilot signal. For example, the report receiving circuitry 1142 may be configured to implement one or more of the functions described below in relation, to FIG. 12, including, e.g., block 1204, and in relation to FIG. 13, including, e.g., block 1304. The processor 1104 may further include TRP signal pre-equalizing circuitry 1144 configured for various functions, including, for example, pre-equalizing a multi-transmission-reception point (TRP) signal for transmission via the first transmission path and the second transmission path based on the message. For example, the TRP signal pre-equalizing circuitry 1144 may be configured to implement one or more of the functions described below in relation to FIG. 12, including, e.g., block 1206, and in relation to FIG. 13, including, e.g., block 1306. The processor 1104 may further include TRP signal transmitting circuitry 1146 configured for various functions, including, for example, transmitting the multi-TRP signal to the UE via the first transmission path and the second transmission path. For example, the TRP signal transmitting circuitry 1146 may be configured to implement one or more of the functions described below in relation to FIG. 12, including, e.g., block 1208, and in relation to FIG. 13, including, e.g., block 1308.

In one or more examples, the computer-readable storage medium 1106 may include pilot signal transmitting instructions 1150 configured for various functions, including, for example, transmitting a first pilot signal to a user equipment (UE) via a first transmission path and transmitting a second pilot signal to the UE via a second transmission path. For example, the pilot signal transmitting instructions 1150 may be configured to implement one or more of the functions described below in relation to FIG. 12, including, e.g., block 1202, and in relation to FIG. 13, including, e.g., block 1302. The computer-readable storage medium 1106 may further include report receiving instructions 1152 configured for various functions, including, for example, receiving a message (e.g., report) from the UE based on a first time delay (and a first phase and/or first amplitude) at which the UE receives the first pilot signal and a second time delay (and a second phase and/or second amplitude) at which the UE receives the second pilot signal. For example, the report receiving instructions 1152 may be configured to implement one or more of the functions described below in relation to FIG. 12, including, e.g., block 1204, and in relation to FIG. 13, including, e.g., block 1304. The computer-readable storage medium 1106 may further include TRP signal pre-equalizing instructions 1154 configured for various functions, including, for example, pre-equalizing a multi-transmission-reception point (TRP) signal for transmission via the first transmission path and the second transmission path based on the message. For example, the TRP signal pre-equalizing instructions 1154 may be configured to implement one or more of the functions described below in relation to FIG. 12, including, e.g., block 1206, and in relation to FIG. 13, including, e.g., block 1306. The computer-readable storage medium 1106 may further include TRP signal transmitting instructions 1156 configured for various functions, including, for example, transmitting the multi-TRP signal to the UE via the first transmission path and the second transmission path. For example, the TRP signal transmitting instructions 1156 may be configured to implement one or more of the functions described below in relation to FIG. 12, including, e.g., block 1208, and in relation to FIG. 13, including, e.g., block 1308.

Figure 12:
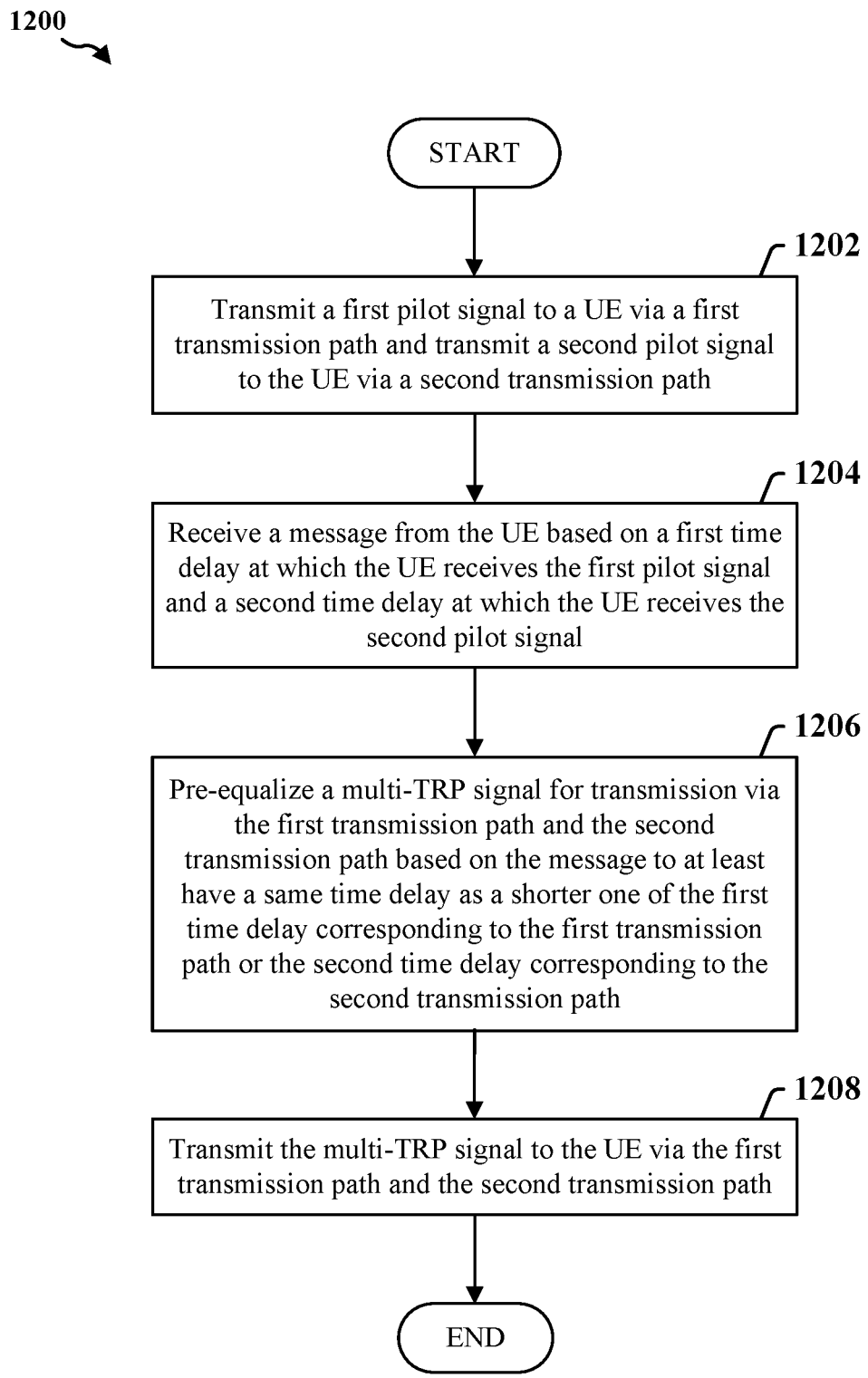
FIG. 12 is a flow chart illustrating an exemplary process for receiving a report from a UE of time delays of signals transmitted via multiple transmission paths in order for a base station to pre-equalize a future transmission to the UE in accordance with aspects of the present disclosure.

FIG. 12 is a flow chart illustrating an exemplary process 1200 for receiving a report from a UE of time delays of signals transmitted via multiple transmission paths (e.g., multiple transmission-reception points (TRPs)) in order for a base station to pre-equalize a future transmission to the UE in accordance with aspects of the present disclosure. As described below, some or all illustrated features may be omitted in a particular implementation within the scope of the present disclosure, and some illustrated features may not be required for implementation of all aspects. In some examples, the process 1200 may be carried out by the base station 1100 illustrated in FIG. 11, which may be a base station or gNB, as illustrated in any one or more of FIGS. 1 and 3-7. In some examples, the process 1200 may be carried out by any suitable apparatus or means for carrying out the functions or algorithm described below.

At block 1202, the base station transmits a first pilot signal to a user equipment (UE) via a first transmission path (e.g., via first transmission path 608 or first TRP 704) and transmits a second pilot signal to the UE via a second transmission path (e.g., via second transmission path 610 or second TRP 706). In an aspect, the base station transmits the first pilot signal in a first symbol and transmits the second pilot signal in a second symbol different from the first symbol. In another aspect, the base station transmits the first pilot signal in a same symbol as the second pilot signal and transmits the second pilot signal in the same symbol as the first pilot signal, wherein the second pilot signal has a cyclic delay with respect to the first pilot signal.

At block 1204, the base station receives a message (e.g., report) from the UE based on a first time delay (e.g., $t_1$) at which the UE receives the first pilot signal and a second time delay (e.g., $t_2$) at which the UE receives the second pilot signal. In an aspect, the message includes an indication of the first time delay and the second time delay. In another aspect, the message includes a time difference between the first time delay and the second time delay, and an indication of whether the first transmission path or the second transmission path has a longer time delay.

At block 1206, the base station pre-equalizes a multi-transmission-reception point (TRP) signal for transmission via the first transmission path and the second transmission path based on the message to at least have a same time delay as a shorter one of the first time delay corresponding to the first transmission path or the second time delay corresponding to the second transmission path. At block 1208, the base station transmits the multi-TRP signal to the UE via the first transmission path and the second transmission path.

In an aspect, the message may further include a first phase at which the UE receives the first pilot signal via the first transmission path and a second phase at which the UE receives the second pilot signal via the second transmission path. Alternatively, the message may further include a phase difference between the first phase at which the UE receives the first pilot signal via the first transmission path and the second phase at which the UE receives the second pilot signal via the second transmission path. Accordingly, at block 1206, the base station may further pre-equalize the multi-TRP signal for transmission via the first transmission path and the second transmission path based on the message to have a same phase as one of the first phase or the second phase.

In another aspect, the message may further include a first amplitude of the first pilot signal received by the UE via the first transmission path and a second amplitude of the second pilot signal received by the UE via the second transmission path. Accordingly, at block 1206, the base station may further pre-equalize the multi-TRP signal for transmission via the first transmission path and the second transmission path based on the message to have a same amplitude as one of the first amplitude or the second amplitude.

In one configuration, the base station 1100 for wireless communication includes means (e.g., pilot signal transmitting circuitry 1140) for transmitting a first pilot signal to a user equipment (UE) via a first transmission path, means (e.g., pilot signal transmitting circuitry 1140) for transmitting a second pilot signal to the UE via a second transmission path, means (e.g., report receiving circuitry 1142) for receiving a message (e.g., report) from the UE based on a first time delay (and first phase and/or first amplitude) at which the UE receives the first pilot signal and a second time delay (and second phase and/or second amplitude) at which the UE receives the second pilot signal, means (e.g., TRP signal pre-equalizing circuitry 1144) for pre-equalizing a multi-transmission-reception point (TRP) signal for transmission via the first transmission path and the second transmission path based on the message (e.g., to at least have a same time delay as a shorter one of the first time delay corresponding to the first transmission path or the second time delay corresponding to the second transmission path), and means (e.g., TRP signal transmitting circuitry 1146) for transmitting the multi-TRP signal to the UE via the first transmission path and the second transmission path. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and 3-7 and utilizing, for example, the processes and/or algorithms described herein in relation to FIG. 12.

Figure 13:
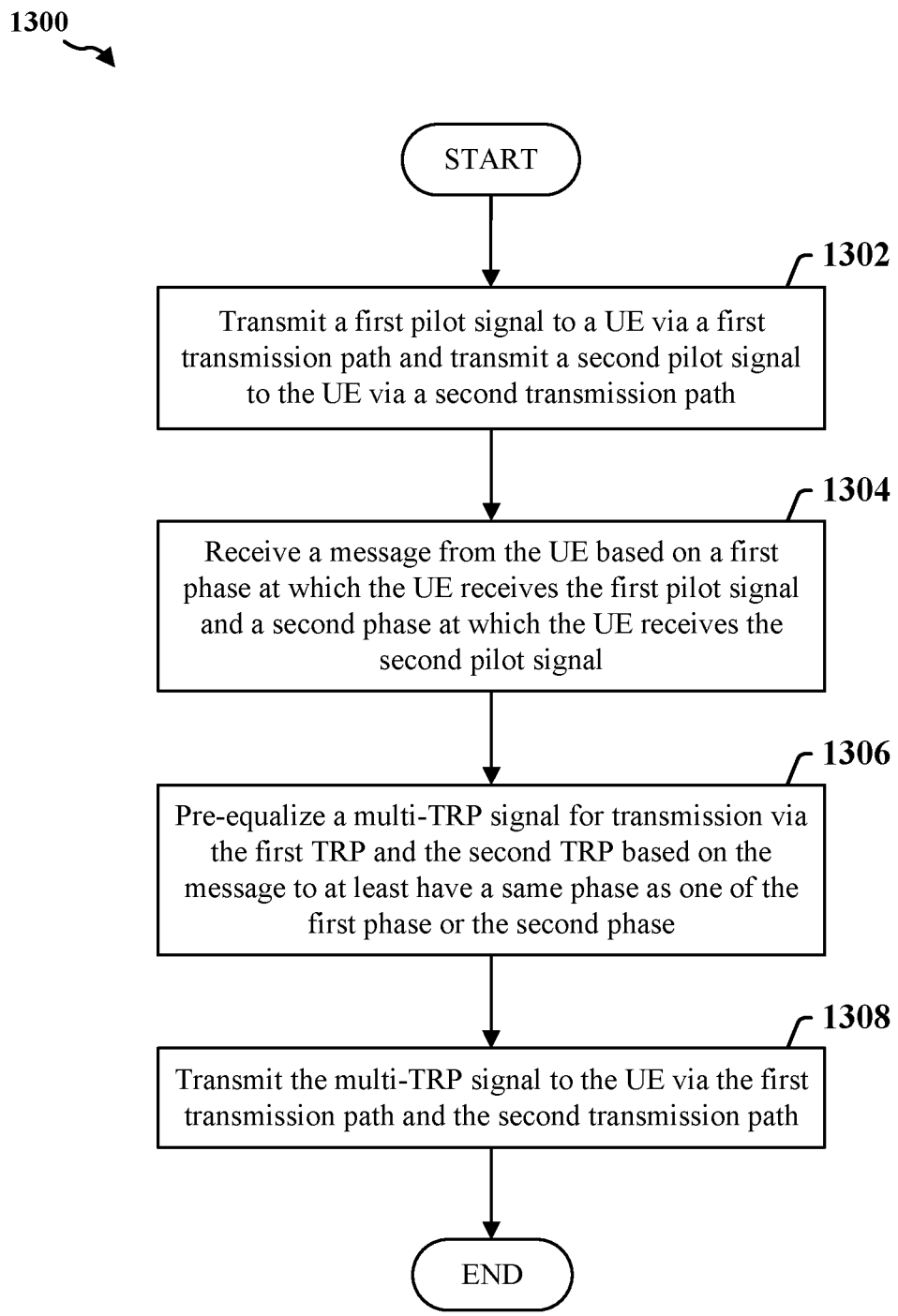
FIG. 13 is a flow chart illustrating an exemplary process for receiving a report from a UE of phases of signals transmitted via multiple transmission paths in order for a base station to pre-equalize a future transmission to the UE in accordance with aspects of the present disclosure.

FIG. 13 is a flow chart illustrating an exemplary process 1300 for receiving a report from a UE of phases of signals transmitted via multiple transmission paths (e.g., multiple transmission-reception points (TRPs)) in order for a base station to pre-equalize a future transmission to the UE in accordance with aspects of the present disclosure. As described below, some or all illustrated features may be omitted in a particular implementation within the scope of the present disclosure, and some illustrated features may not be required for implementation of all aspects. In some examples, the process 1300 may be carried out by the base station 1100 illustrated in FIG. 11, which may be a base station or gNB, as illustrated in any one or more of FIGS. 1 and 3-7. In some examples, the process 1300 may be carried out by any suitable apparatus or means for carrying out the functions or algorithm described below.

At block 1302, the base station transmits a first pilot signal to a user equipment (UE) via a first transmission path (e.g., via first transmission path 608 or first TRP 704) and transmits a second pilot signal to the UE via a second transmission path (e.g., via second transmission path 610 or second TRP 706). In an aspect, the base station transmits the first pilot signal in a first symbol and transmits the second pilot signal in a second symbol different from the first symbol. In another aspect, the base station transmits the first pilot signal in a same symbol as the second pilot signal and transmits the second pilot signal in the same symbol as the first pilot signal, wherein the second pilot signal has a cyclic delay with respect to the first pilot signal.

At block 1304, the base station receives a message (e.g., report) from the UE based on a first phase (e.g., $\theta_1$) at which the UE receives the first pilot signal and a second phase (e.g., $\theta_2$) at which the UE receives the second pilot signal. In an aspect, the message includes an indication of the first phase and the second phase. In another aspect, the message includes a phase difference between the first phase and the second phase.

At block 1306, the base station pre-equalizes a multi-transmission-reception point (TRP) signal for transmission via the first transmission path and the second transmission path based on the message to at least have a same phase as one of the first phase or the second phase. At block 1308, the base station transmits the multi-TRP signal to the UE via the first transmission path and the second transmission path.

In an aspect, the message may further include a first time delay at which the UE receives the first pilot signal via the first transmission path and a second time delay at which the UE receives the second pilot signal via the second transmission path. Alternatively, the message may further include a time difference between the first time delay at which the UE receives the first pilot signal via, the first transmission, path and the second time delay at which the UE receives the second pilot signal via the second transmission path. Accordingly, at block 1306, the base station may further pre-equalize the multi-TRP signal for transmission via the first transmission path and the second transmission path based on the message to have a same time delay as a shorter one of the first time delay corresponding to the first transmission path or the second time delay corresponding to the second transmission path.

In another aspect, the message may further include a first amplitude of the first pilot signal received by the UE via the first transmission path and a second amplitude of the second pilot signal received by the UE via the second transmission path. Accordingly, at block 1306, the base station may further pre-equalize the multi-TRP signal for transmission via the first transmission path and the second transmission path based on the message to have a same amplitude as one of the first amplitude or the second amplitude.

In one configuration, the base station 1100 for wireless communication includes means (e.g., pilot signal transmitting circuitry 1140) for transmitting a first pilot signal to a user equipment (UE) via a first transmission path, means (e.g., pilot signal transmitting circuitry 1140) for transmitting a second pilot signal to the UE via a second transmission path, means (e.g., report receiving circuitry 1142) for receiving a message (e.g., report) from the UE based on a first phase (and first time delay and/or first amplitude) at which the UE receives the first pilot signal and a second phase (and second time delay and/or second amplitude) at which the UE receives the second pilot signal, means (e.g., TRP signal pre-equalizing circuitry 1144) for pre-equalizing a multi-transmission-reception point (TRP) signal for transmission via the first transmission path and the second transmission path based on the message (e.g., to at least have a same phase as one of the first phase or the second phase), and means (e.g., TRP signal transmitting circuitry 1146) for transmitting the multi-TRP signal to the UE via the first transmission path and the second transmission path. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and 3-7 and utilizing, for example, the processes and/or algorithms described herein in relation to FIG. 13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (UE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even—if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of examples of the present disclosure:

Example 1: A method of wireless communication performed at a user equipment (UE), comprising: determining a first time delay for receiving a first pilot signal from a base station via a first transmission path; determining a second time delay for receiving a second pilot signal from the base station via a second transmission path; generating a message (e.g., report) based on the first time delay and the second time delay; sending the message to the base station; and receiving a multi-transmission-reception point (TRP) signal from the base station via the first transmission path and the second transmission path, wherein the multi-TRP signal is pre-equalized for transmission via the first transmission path and the second transmission path based on the message to at least have a same time delay as a shorter one of the first time delay corresponding to the first transmission path or the second time delay corresponding to the second transmission path.

Example 2: The method of example 1, further comprising: receiving the first pilot signal via the first transmission path; and receiving the second pilot signal via the second transmission path.

Example 3: The method of example 1 or 2, wherein: the receiving the first pilot signal comprises receiving the first pilot signal in a first symbol and the receiving the second pilot signal comprises receiving the second pilot signal in a second symbol different from the first symbol; or the receiving the first pilot signal comprises receiving the first pilot signal in a same symbol as the second pilot signal and the receiving the second pilot signal comprises receiving the second pilot signal in the same symbol as the first pilot signal, wherein the second pilot signal has a cyclic delay with respect to the first pilot signal.

Example 4: The method of any one of examples 1 through 3, wherein the generating the message comprises indicating the first time delay and the second time delay in the message.

Example 5: The method of any one of examples 1 through 4, wherein the generating the message comprises: determining a time difference between the first time delay and the second time delay; determining whether the first transmission path or the second transmission path has a longer time delay based on the first time delay and the second time delay; and indicating, in the message, the time difference and whether the first transmission path or the second transmission path has the longer time delay.

Example 6: The method of any one of examples 1 through 5, further comprising: determining a first phase of the first pilot signal received via the first transmission path; and determining a second phase of the second pilot signal received via the second transmission path.

Example 7: The method of any one of examples 1 through 6, wherein the generating the message comprises indicating the first phase and the second phase in the message, and wherein the multi-TRP signal is further pre-equalized for transmission via the first transmission path and the second transmission path based on the message to have a same phase as one of the first phase or the second phase.

Example 8: The method of any one of examples 1 through 7, wherein the generating the message comprises: determining a phase difference between the first phase and the second phase; and indicating the phase difference in the message, wherein the multi-TRP signal is further pre-equalized for transmission via the first transmission path and the second transmission path based on the message to have a same phase as one of the first phase or the second phase.

Example 9: The method of any one of examples 1 through 8, further comprising: determining a first amplitude of the first pilot signal received via the first transmission path; and determining a second amplitude of the second pilot signal received via the second transmission path, wherein the generating the message comprises indicating the first amplitude and the second amplitude in the message, and wherein the multi-TRP signal is further pre-equalized for transmission via the first transmission path and the second transmission path based on the message to have a same amplitude as one of the first amplitude or the second amplitude.

Example 10: A method of wireless communication performed at a user equipment (UE), comprising: determining a first phase of a first pilot signal received from a base station via a first transmission path; determining a second phase of a second pilot signal received from the base station via a second transmission path; generating a message (e.g., report) based on the first phase and the second phase; sending the message to the base station; and receiving a multi-transmission-reception point (TRP) signal from the base station via the first transmission path and the second transmission path, wherein the multi-TRP signal is pre-equalized for transmission via the first transmission path and the second transmission path based on the message to at least have a same phase as one of the first phase or the second phase.

Example 11: The method of example 10, further comprising: receiving the first pilot signal via the first transmission path; and receiving the second pilot signal via the second transmission path.

Example 12: The method of example 10 or 11, wherein: the receiving the first pilot signal comprises receiving the first pilot signal in a first symbol and the receiving the second pilot signal comprises receiving the second pilot signal in a second symbol different from the first symbol: or the receiving the first pilot signal comprises receiving the first pilot signal in a same symbol as the second pilot signal and the receiving the second pilot signal comprises receiving the second pilot signal in the same symbol as the first pilot signal, wherein the second pilot signal has a cyclic delay with respect to the first pilot signal.

Example 13: The method of any one of examples 10 through 12, wherein the generating the message comprises indicating the first phase and the second phase in the message.

Example 14: The method of any one of examples 10 through 13, wherein the generating the message comprises: determining a phase difference between the first phase and the second phase; and indicating the phase difference in the message.

Example 15: The method of any one of examples 10 through 14, further comprising: determining a first time delay for receiving the first pilot signal via the first transmission path; and determining a second time delay for receiving the second pilot signal via the second transmission path.

Example 16: The method of any of examples 10 through 15, wherein the generating the message comprises indicating the first time delay and the second time delay in the message, wherein the multi-TRP signal is further pre-equalized for transmission via the first transmission path and the second transmission path based on the message to have a same time delay as a shorter one of the first time delay corresponding to the first transmission path or the second time delay corresponding to the second transmission path.

Example 17: The method of any one of examples 10 through 16, wherein the generating the message comprises: determining a time difference between the first time delay and the second time delay; determining whether the first pilot signal or the second pilot signal has a longer time delay based on the first time delay and the second time delay; and indicating, in the message, the time difference and whether the first pilot signal or the second pilot signal has the longer time delay, wherein the multi-TRP signal is further pre-equalized for transmission via the first transmission path and the second transmission path based on the message to have a same time delay as a shorter one of the first time delay corresponding to the first transmission path or the second time delay corresponding to the second transmission path.

Example 18: The method of any one of examples 10 through 17, further comprising: determining a first amplitude of the first pilot signal received via the first transmission path; and determining a second amplitude of the second pilot signal received via the second transmission path, wherein the generating the message comprises indicating the first amplitude and the second amplitude in the message, and wherein the multi-TRP signal is further pre-equalized for transmission via the first transmission path and the second transmission path based on the message to have a same amplitude as one of the first amplitude or the second amplitude.

Example 19: A user equipment (UE) comprising at least one processor, and a memory coupled to the at least one processor, the at least one processor and the memory configured to perform a method of any one of examples 1 through 9 or examples 10 through 18.

Example 20: A user equipment (UE) comprising at least one means for performing a method of any one of examples 1 through 9 or examples 10 through 18.

Example 21: A non-transitory computer-readable medium storing code at a user equipment (UE), the code comprising instructions executable by a processor to perform a method of any one of examples 1 through 9 or examples 10 through 18.

Example 22: A method of wireless communication performed at a base station, comprising: transmitting a first pilot signal to a user equipment (UE) via a first transmission path; transmitting a second pilot signal to the UE via a second transmission path; receiving a message (e.g., report) from the UE based on a first time delay at which the UE receives the first pilot signal and a second time delay at which the UE receives the second pilot signal; pre-equalizing a multi-transmission-reception point (TRP) signal for transmission via the first transmission path and the second transmission path based on the message to at least have a same time delay as a shorter one of the first time delay corresponding to the first transmission path or the second time delay corresponding to the second transmission path; and transmitting the multi-TRP signal to the UE via the first transmission path and the second transmission path.

Example 23: The method of example 22, wherein: the transmitting the first pilot signal comprises transmitting the first pilot signal in a first symbol and the transmitting the second pilot signal comprises transmitting the second pilot signal in a second symbol different from the first symbol; or the transmitting the first pilot signal comprises transmitting the first pilot signal in a same symbol as the second pilot signal and the transmitting the second pilot signal comprises transmitting the second pilot signal in the same symbol as the first pilot signal, wherein the second pilot signal has a cyclic delay with respect to the first pilot signal.

Example 24: The method of example 22 or 23, wherein the message comprises an indication of the first time delay and the second time delay.

Example 25: The method of any one of examples 22 through 24, wherein the message comprises: a time difference between the first time delay and the second time delay; and an indication of whether the first transmission path or the second transmission path has a longer time delay.

Example 26: The method of any one of examples 22 through 25, wherein the message comprises: a first phase at which the UE receives the first pilot signal via the first transmission path; and a second phase at which the UE receives the second pilot signal via the second transmission path, wherein the pre-equalizing the multi-TRP signal comprises further pre-equalizing the multi-TRP signal for transmission via the first transmission path and the second transmission path based on the message to have a same phase as one of the first phase or the second phase.

Example 27: The method of any one of examples 22 through 26, wherein the message comprises: a phase difference between a first phase at which the UE receives the first pilot signal via the first transmission path and a second phase at which the UE receives the second pilot signal via the second transmission path, wherein the pre-equalizing the multi-TRP signal comprises further pre-equalizing the multi-TRP signal for transmission via the first transmission path and the second transmission path based on the message to have a same phase as one of the first phase or the second phase.

Example 28: The method of any one of examples 22 through 27, wherein the message comprises: a first amplitude of the first pilot signal received by the UE via the first transmission path; and a second amplitude of the second pilot signal received by the UE via the second transmission path, wherein the pre-equalizing the multi-TRP signal comprises further pre-equalizing the multi-TRP signal for transmission via the first transmission path and the second transmission path based on the message to have a same amplitude as one of the first amplitude or the second amplitude.

Example 29: A method of wireless communication performed at a base station, comprising: transmitting a first pilot signal to a user equipment (UE) via a first transmission path; transmitting a second pilot signal to the UE via a second transmission path; receiving a message (e.g., report) from the UE based on a first phase at which the UE receives the first pilot signal and a second phase at which the UE receives the second pilot signal; pre-equalizing a multi-transmission-reception point (TRP) signal for transmission via the first transmission path and the second transmission path based on the message to at least have a same phase as one of the first phase or the second phase; and transmitting the multi-TRP signal to the UE via the first transmission path and the second transmission path.

Example 30: The method of example 29, wherein: the transmitting the first pilot signal comprises transmitting the first pilot signal in a first symbol and the transmitting the second pilot signal comprises transmitting the second pilot signal in a second symbol different from the first symbol; or the transmitting the first pilot signal comprises transmitting the first pilot signal in a same symbol as the second pilot signal and the transmitting the second pilot signal comprises transmitting the second pilot signal in the same symbol as the first pilot signal, wherein the second pilot signal has a cyclic delay with respect to the first pilot signal.

Example 31: The method of example 29 or 30, wherein the message comprises an indication of the first phase and the second phase.

Example 32: The method of any one of examples 29 through 31, wherein the message comprises: a phase difference between the first phase and the second phase.

Example 33: The method of any one of examples 29 through 32, wherein the message comprises: a first time delay at which the UE receives the first pilot signal via the first transmission path; and a second time delay at which the UE receives the second pilot signal via the second transmission path, wherein the pre-equalizing the multi-TRP signal comprises further pre-equalizing the multi-TRP signal for transmission via the first transmission path and the second transmission path based on the message to have a same time delay as a shorter one of the first time delay corresponding to the first transmission path or the second time delay corresponding to the second transmission path.

Example 34: The method of any one of examples 29 through 33, wherein the message comprises: a time difference between a first time delay at which the UE receives the first pilot signal via the first transmission path and a second time delay at which the UE receives the second pilot signal via the second transmission path; and an indication of whether the first pilot signal or the second pilot signal has a longer time delay, wherein the pre-equalizing the multi-TRP signal comprises further pre-equalizing the multi-TRP signal for transmission via the first transmission path and the second transmission path based on the message to have a same time delay as a shorter one of the first time delay corresponding to the first transmission path or the second time delay corresponding to the second transmission path.

Example 35: The method of any one of examples 29 through 34, wherein the message comprises: a first amplitude of the first pilot signal received by the UE via the first transmission path; and a second amplitude of the second pilot signal received by the UE via the second transmission path, wherein the pre-equalizing the multi-TRP signal comprises further pre-equalizing the multi-TRP signal for transmission via the first transmission path and the second transmission path based on the message to have a same amplitude as one of the first amplitude or the second amplitude.

Example 36: A base station comprising at least one processor, and a memory coupled to the at least one processor, the at least one processor and the memory configured to perform a method of any one of examples 22 through 28 or examples 29 through 35.

Example 37: A base station comprising at least one means for performing method of any one of examples 22 through 28 or examples 29 through 35.

Example 38: A non-transitory computer-readable medium storing code at a base station, the code comprising instructions executable by a processor to perform la method of any one of examples 22 through 28 or examples 29 through 35.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and h; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for,"

What is claimed is:

1. A method of wireless communication performed at a user equipment (UE), comprising:
   determining a first amplitude of a first pilot signal received from a network entity via a first transmission path;
   determining a second amplitude of a second pilot signal received from the network entity via a second transmission path;
   generating a message based on the first amplitude and the second amplitude;
   sending the message to the network entity; and
   receiving a pre-equalized multi-transmission-reception point (TRP) signal from the network entity via the first transmission path and the second transmission path based on the message.

2. The method of claim 1, wherein the generating the message comprises indicating the first amplitude and the second amplitude in the message.

3. The method of claim 2, wherein the pre-equalized multi-TRP signal received via the first transmission path and the second transmission path based on the message has a same amplitude as one of the first amplitude or the second amplitude.

4. The method of claim 1, further comprising:
   receiving the first pilot signal via the first transmission path; and
   receiving the second pilot signal via the second transmission path.

5. The method of claim 4, wherein:
the receiving the first pilot signal comprises receiving the first pilot signal in a first symbol and the receiving the second pilot signal comprises receiving the second pilot signal in a second symbol different from the first symbol; or
the receiving the first pilot signal comprises receiving the first pilot signal in a same symbol as the second pilot signal and the receiving the second pilot signal comprises receiving the second pilot signal in the same symbol as the first pilot signal, wherein the second pilot signal has a cyclic delay with respect to the first pilot signal.

6. An apparatus for wireless communication at a user equipment (UE), comprising:
one or more processors; and
a memory coupled to the one or more processors, the one or more processors configured to cause the UE to:
determine a first amplitude of a first pilot signal received from a network entity via a first transmission path;
determine a second amplitude of a second pilot signal received from the network entity via a second transmission path;
generate a message based on the first amplitude and the second amplitude;
send the message to the network entity; and
receive a pre-equalized multi-transmission-reception point (TRP) signal from the network entity via the first transmission path and the second transmission path based on the message.

7. The apparatus of claim 6, wherein the one or more processors configured to cause the UE to generate the message are configured to cause the UE to indicate the first amplitude and the second amplitude in the message.

8. The apparatus of claim 7, wherein the pre-equalized multi-TRP signal received via the first transmission path and the second transmission path based on the message has a same amplitude as one of the first amplitude or the second amplitude.

9. The apparatus of claim 6, further comprising a transceiver, wherein the one or more processors are further configured to cause the UE to:
receive, via the transceiver, the first pilot signal via the first transmission path; and
receive, via the transceiver, the second pilot signal via the second transmission path.

10. The apparatus of claim 9, wherein:
the one or more processors are configured to cause the UE to receive the first pilot signal in a first symbol and receive the second pilot signal in a second symbol different from the first symbol; or
the one or more processors are configured to cause the UE to receive the first pilot signal in a same symbol as the second pilot signal and receive the second pilot signal in the same symbol as the first pilot signal, wherein the second pilot signal has a cyclic delay with respect to the first pilot signal.

11. A non-transitory computer-readable medium storing code at a user equipment (UE), the code comprising instructions executable by one or more processors to:
determine a first amplitude of a first pilot signal received from a network entity via a first transmission path;
determine a second amplitude of a second pilot signal received from the network entity via a second transmission path;
generate a message based on the first amplitude and the second amplitude,
send the message to the network entity; and
receive a pre-equalized multi-transmission-reception point (TRP) signal from the network entity via the first transmission path and the second transmission path based on the message.

12. The non-transitory computer-readable medium of claim 11, wherein the code comprising instructions executable by the one or more processors to generate the message are configured to indicate the first amplitude and the second amplitude in the message.

13. The non-transitory computer-readable medium of claim 12, wherein the pre-equalized multi-TRP signal received via the first transmission path and the second transmission path based on the message has a same amplitude as one of the first amplitude or the second amplitude.

14. The non-transitory computer-readable medium of claim 11, wherein the code further comprises instructions executable by the one or more processors to:
receive the first pilot signal via the first transmission path; and
receive the second pilot signal via the second transmission path.

15. The non-transitory computer-readable medium of claim 14, wherein the code further comprises instructions executable by the one or more processors to:
receive the first pilot signal in a first symbol and receive the second pilot signal in a second symbol different from the first symbol; or
receive the first pilot signal in a same symbol as the second pilot signal and receive the second pilot signal in the same symbol as the first pilot signal, wherein the second pilot signal has a cyclic delay with respect to the first pilot signal.

16. A method of wireless communication performed at a network entity, comprising:
transmitting a first pilot signal via a first transmission path;
transmitting a second pilot signal via a second transmission path;
receiving a message based on a first amplitude of the first pilot signal and a second amplitude of the second pilot signal;
pre-equalizing a multi-transmission-reception point (TRP) signal for transmission based on the message; and
transmitting the multi-TRP signal via the first transmission path and the second transmission path.

17. The method of claim 16, wherein the message is received from a user equipment (UE), and the message comprises:
the first amplitude of the first pilot signal received by the UE via the first transmission path; and
the second amplitude of the second pilot signal received by the UE via the second transmission path.

18. The method of claim 17, wherein the pre-equalizing the multi-TRP signal comprises pre-equalizing the multi-TRP signal for transmission via the first transmission path and the second transmission path based on the message to have a same amplitude as one of the first amplitude or the second amplitude.

19. The method of claim 16, wherein:
the transmitting the first pilot signal comprises transmitting the first pilot signal in a first symbol and the transmitting the second pilot signal comprises transmitting the second pilot signal in a second symbol different from the first symbol; or the transmitting the first pilot signal comprises transmitting the first pilot signal in a same symbol as the second pilot signal and the transmitting the second pilot signal comprises transmitting the second pilot signal in the same symbol as the first pilot signal, wherein the second pilot signal has a cyclic delay with respect to the first pilot signal.

20. An apparatus for wireless communication at a network entity, comprising:
one or more processors; and
a memory coupled to the one or more processors, the one or more processors configured to cause the network entity to:
transmit a first pilot signal via a first transmission path;
transmit a second pilot signal via a second transmission path;
receive a message based on a first amplitude of the first pilot signal and a second amplitude of the second pilot signal;
pre-equalize a multi-transmission-reception point (TRP) signal for transmission based on the message; and
transmit the multi-TRP signal via the first transmission path and the second transmission path.

21. The apparatus of claim 20, further comprising a transceiver, wherein the message is received from a user equipment (UE), and the message comprises:
the first amplitude of the first pilot signal received by the UE via the first transmission path; and
the second amplitude of the second pilot signal received by the UE via the second transmission path.

22. The apparatus of claim 21, wherein the one or more processors configured to cause the network entity to pre-equalize the multi-TRP signal are configured to cause the network entity to pre-equalize the multi-TRP signal for transmission via the first transmission path and the second transmission path based on the message to have a same amplitude as one of the first amplitude or the second amplitude.

23. The apparatus of claim 20, wherein:
the one or more processors are configured to cause the network entity to transmit the first pilot signal in a first symbol and transmit the second pilot signal in a second symbol different from the first symbol; or
the one or more processors are configured to cause the network entity to transmit the first pilot signal in a same symbol as the second pilot signal and transmit the second pilot signal in the same symbol as the first pilot signal, wherein the second pilot signal has a cyclic delay with respect to the first pilot signal.

24. A non-transitory computer-readable medium storing code at a network entity, the code comprising instructions executable by one or more processors to:
transmit a first pilot signal via a first transmission path;
transmit a second pilot signal via a second transmission path;
receive a message based on a first amplitude of the first pilot signal and a second amplitude of the second pilot signal;
pre-equalize a multi-transmission-reception point (TRP) signal for transmission based on the message; and
transmit the multi-TRP signal via the first transmission path and the second transmission path.

25. The non-transitory computer-readable medium of claim 24, wherein the message is received from a user equipment (UE), and the message comprises:
the first amplitude of the first pilot signal received by the UE via the first transmission path; and
the second amplitude of the second pilot signal received by the UE via the second transmission path.

26. The non-transitory computer-readable medium of claim 25, wherein the code comprising instructions executable by the one or more processors to pre-equalize the multi-TRP signal is configured to pre-equalize the multi-TRP signal for transmission via the first transmission path and the second transmission path based on the message to have a same amplitude as one of the first amplitude or the second amplitude.

27. The non-transitory computer-readable medium of claim 24, wherein the code further comprises instructions executable by the one or more processors to:
transmit the first pilot signal in a first symbol and transmit the second pilot signal in a second symbol different from the first symbol; or
transmit the first pilot signal in a same symbol as the second pilot signal and transmit the second pilot signal in the same symbol as the first pilot signal, wherein the second pilot signal has a cyclic delay with respect to the first pilot signal.

28. An apparatus for wireless communication at a user equipment (UE), comprising:
means for determining a first amplitude of a first pilot signal received from a network entity via a first transmission path;
means for determining a second amplitude of a second pilot signal received from the network entity via a second transmission path;
means for generating a message based on the first amplitude and the second amplitude;
means for sending the message to the network entity; and
means for receiving a pre-equalized multi-transmission-reception point (TRP) signal from the network entity via the first transmission path and the second transmission path based on the message.

29. The apparatus of claim 28, wherein the means for generating the message is configured to indicate the first amplitude and the second amplitude in the message.

30. The apparatus of claim 29, wherein the pre-equalized multi-TRP signal received via the first transmission path and the second transmission path based on the message has a same amplitude as one of the first amplitude or the second amplitude.

31. The apparatus of claim 28, further comprising:
means for receiving the first pilot signal via the first transmission path; and
means for receiving the second pilot signal via the second transmission path.

32. The apparatus of claim 31, wherein:
the means for receiving the first pilot signal is configured to receive the first pilot signal in a first symbol and the means for receiving the second pilot signal is configured to receive the second pilot signal in a second symbol different from the first symbol; or
the means for receiving the first pilot signal is configured to receive the first pilot signal in a same symbol as the second pilot signal and the means for receiving the second pilot signal is configured to receive the second pilot signal in the same symbol as the first pilot signal, wherein the second pilot signal has a cyclic delay with respect to the first pilot signal.

33. An apparatus for wireless communication at a network entity, comprising:
- means for transmitting a first pilot signal via a first transmission path;
- means for transmitting a second pilot signal via a second transmission path;
- means for receiving a message based on a first amplitude of the first pilot signal and a second amplitude of the second pilot signal;
- means for pre-equalizing a multi-transmission-reception point (TRP) signal for transmission based on the message; and
- means for transmitting the multi-TRP signal via the first transmission path and the second transmission path.

34. The apparatus of claim 33, wherein the message is received from a user equipment (UE), and the message comprises:
- the first amplitude of the first pilot signal received by the UE via the first transmission path; and
- the second amplitude of the second pilot signal received by the UE via the second transmission path.

35. The apparatus of claim 34, wherein the means for pre-equalizing the multi-TRP signal is configured to pre-equalize the multi-TRP signal for transmission via the first transmission path and the second transmission path based on the message to have a same amplitude as one of the first amplitude or the second amplitude.

36. The apparatus of claim 33, wherein:
- the means for transmitting the first pilot signal is configured to transmit the first pilot signal in a first symbol and the means for transmitting the second pilot signal is configured to transmit the second pilot signal in a second symbol different from the first symbol; or
- the means for transmitting the first pilot signal is configured to transmit the first pilot signal the means for transmitting the first pilot signal is configured to transmit the first pilot signal in a same symbol as the second pilot signal and the means for transmitting the second pilot signal is configured to transmit the second pilot signal in the same symbol as the first pilot signal, wherein the second pilot signal has a cyclic delay with respect to the first pilot signal.

* * * * *